United States Patent [19]

Long et al.

[11] Patent Number: 5,350,986
[45] Date of Patent: Sep. 27, 1994

[54] VEHICLE POWER DOOR SPEED CONTROL

[75] Inventors: Joseph D. Long, Waterford; Robert S. Strother, St. Clair Shores; Gary D. Bree, Clarkston, all of Mich.

[73] Assignee: General Motors Corp., Detroit, Mich.

[21] Appl. No.: 63,627

[22] Filed: May 20, 1993

[51] Int. Cl.$^5$ .................................. G05B 5/01
[52] U.S. Cl. ..................... 318/432; 318/282; 318/266; 318/466; 318/286
[58] Field of Search ................... 318/280–293, 318/430–434, 466, 465, 444, 467, 138, 599; 187/100–103, 31; 49/360, 28, 25, 138, 139; 83/369; 70/95

[56] References Cited

U.S. PATENT DOCUMENTS

| | | | |
|---|---|---|---|
| 4,234,833 | 11/1980 | Barrett | 318/282 |
| 4,449,078 | 5/1984 | Ogishi et al. | 318/102 |
| 4,529,920 | 7/1985 | Yoshida et al. | 318/466 |
| 4,563,625 | 1/1986 | Kornbrekke et al. | 318/603 |
| 4,640,050 | 2/1987 | Yamagishi et al. | 49/280 |
| 4,673,848 | 6/1987 | Hagiwara et al. | 318/266 |
| 4,775,823 | 10/1988 | Yoshida et al. | 318/266 |
| 4,935,677 | 6/1990 | Yoshida | 318/266 |
| 4,959,598 | 9/1990 | Yoshida et al. | 318/599 |
| 4,984,385 | 1/1991 | DeLand | 49/280 |
| 4,994,724 | 2/1991 | Hsu | 318/603 |
| 4,999,551 | 3/1991 | Yoshida et al. | 318/286 |
| 5,025,591 | 6/1991 | Deland et al. | 49/360 |
| 5,039,925 | 8/1991 | Schap | 318/282 |
| 5,069,000 | 12/1991 | Zuckerman | 49/28 |
| 5,105,131 | 4/1992 | Schap | 318/282 |
| 5,140,316 | 8/1992 | DeLand et al. | 340/825.69 |
| 5,144,769 | 9/1992 | Koura | 49/360 |
| 5,155,937 | 10/1992 | Yamagishi et al. | 49/280 |
| 5,162,711 | 11/1992 | Heckler | 318/264 |

Primary Examiner—Paul Ip
Attorney, Agent, or Firm—Howard N. Conkey

[57] ABSTRACT

A motor is controlled to regulate the speed of a vehicle sliding door whose movement and speed are monitored. The motor control voltage is incrementally adjusted in direction to reduce a sensed speed error only if the door has moved a required distance while the door speed has been continuously outside of the desired speed range since the last incremental adjustment to the control voltage.

2 Claims, 23 Drawing Sheets 5,350,986

1

VEHICLE POWER DOOR SPEED CONTROL

RELATED APPLICATIONS

The following copending applications filed herewith are related: U.S. Ser. No. 08/063,625, filed May 20, 1993, titled "Vehicle Door Manual to Power Move", and U.S. Ser. No. 08/063,620, filed May 20, 1993, titled "Power Vehicle Door With Reversal Control".

BACKGROUND OF THE INVENTION

This invention relates to the control of the speed of an electrically driven door on a motor vehicle.

Electrically driven doors on a vehicle are generally known. For example, it is known to provide an electrically powered sliding door for a van in which the door is opened and closed by operation of an electric motor. The motor torque required to open or close the door typically varies with door position and vehicle inclination. For example, if the vehicle is stopped in a downhill heading, the gravity assist reduces the torque required by the motor to close the door. On the other hand, additional torque is required to close the door if the vehicle is on an uphill heading. If the motor is sized to close the door when the vehicle is on an uphill heading, application of full motor torque to close the door when on a downhill heading will result in a higher door speed.

It is therefore desirable to provide for the control of the speed of the door movement so as to compensate for vehicle inclination and other factors that may affect door movement.

SUMMARY OF THE INVENTION

It is the general object of this invention to provide an improved powered door closure system for a vehicle that regulates the speed of operation of the door.

In a general form of this invention, a motor is controlled to regulate the speed of the door whose movement and speed are monitored. The motor control voltage is incrementally adjusted in direction to reduce a sensed speed error only if the door has moved a required distance while the door speed has been continuously outside of the desired speed range since the last incremental adjustment to the control voltage. This provides for smooth control of door speed while permitting the degree of aggressiveness in control to be adjusted by the selection of the required movement of the door.

In one aspect of the invention, the required distance of door movement while the door speed is continuously too slow may be larger than the required distance of door movement while the door speed is continuously too fast. This results in a more aggressive control of door speed in response to a excessive speed versus the control in response to a speed that is too slow. Further, by making the minimum update period a function of the door movement, a desirable more aggressive reduction in a sensed excessive speed is inherent since the faster the door, the quicker the required distance of door movement occurs.

2

Figure 1:
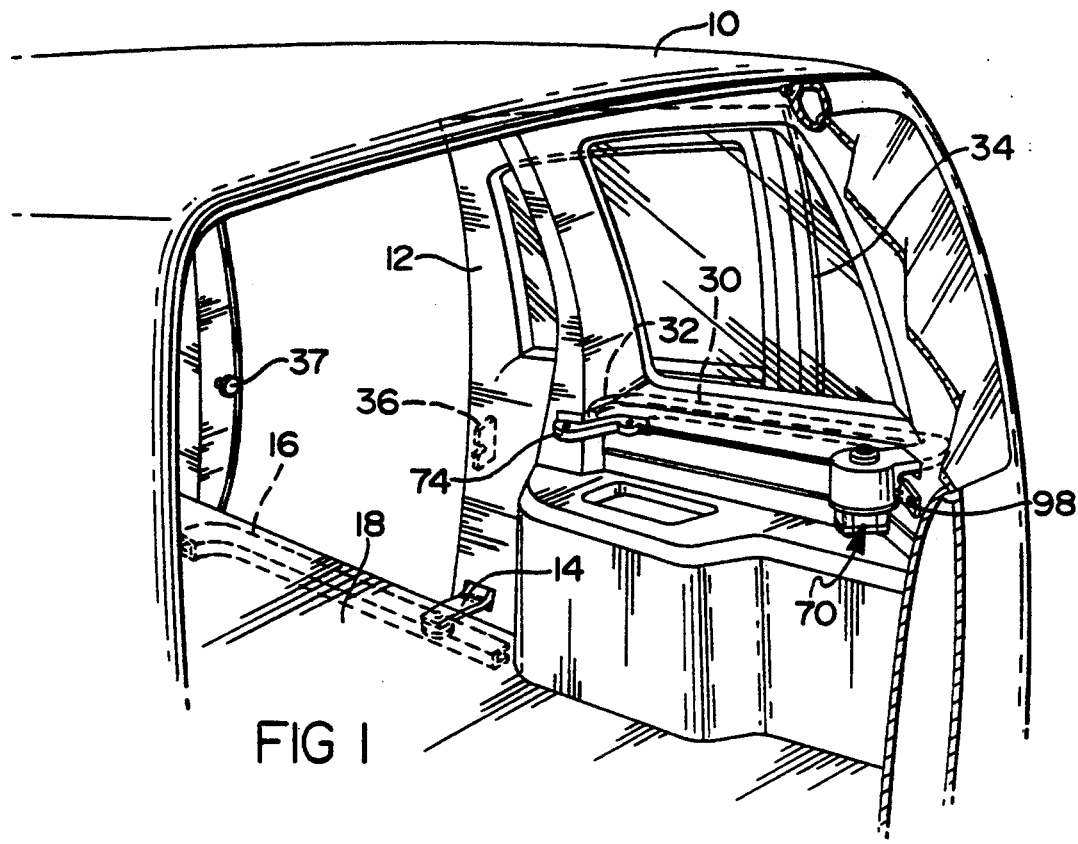
FIG. 1 is a perspective view of a vehicle interior showing the general arrangement of a sliding door with a power door operating mechanism.
Figure 3:
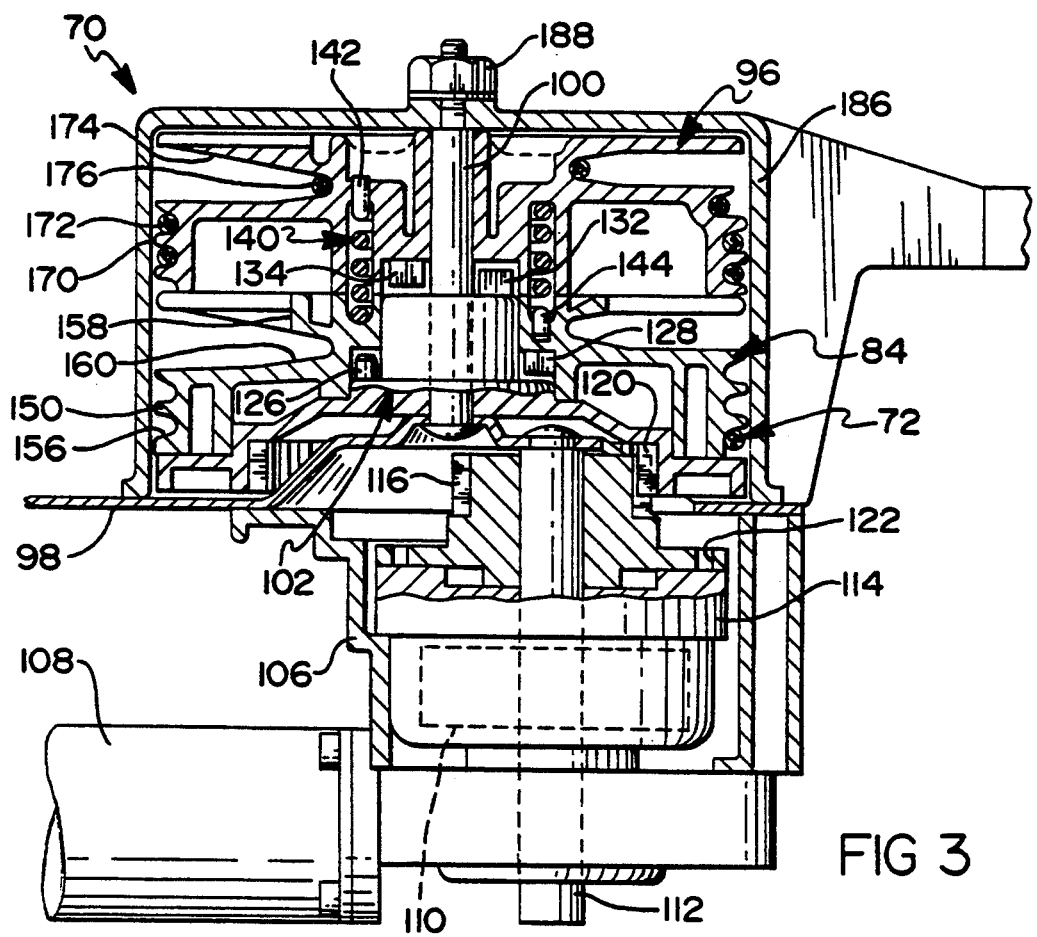
Figure 2:
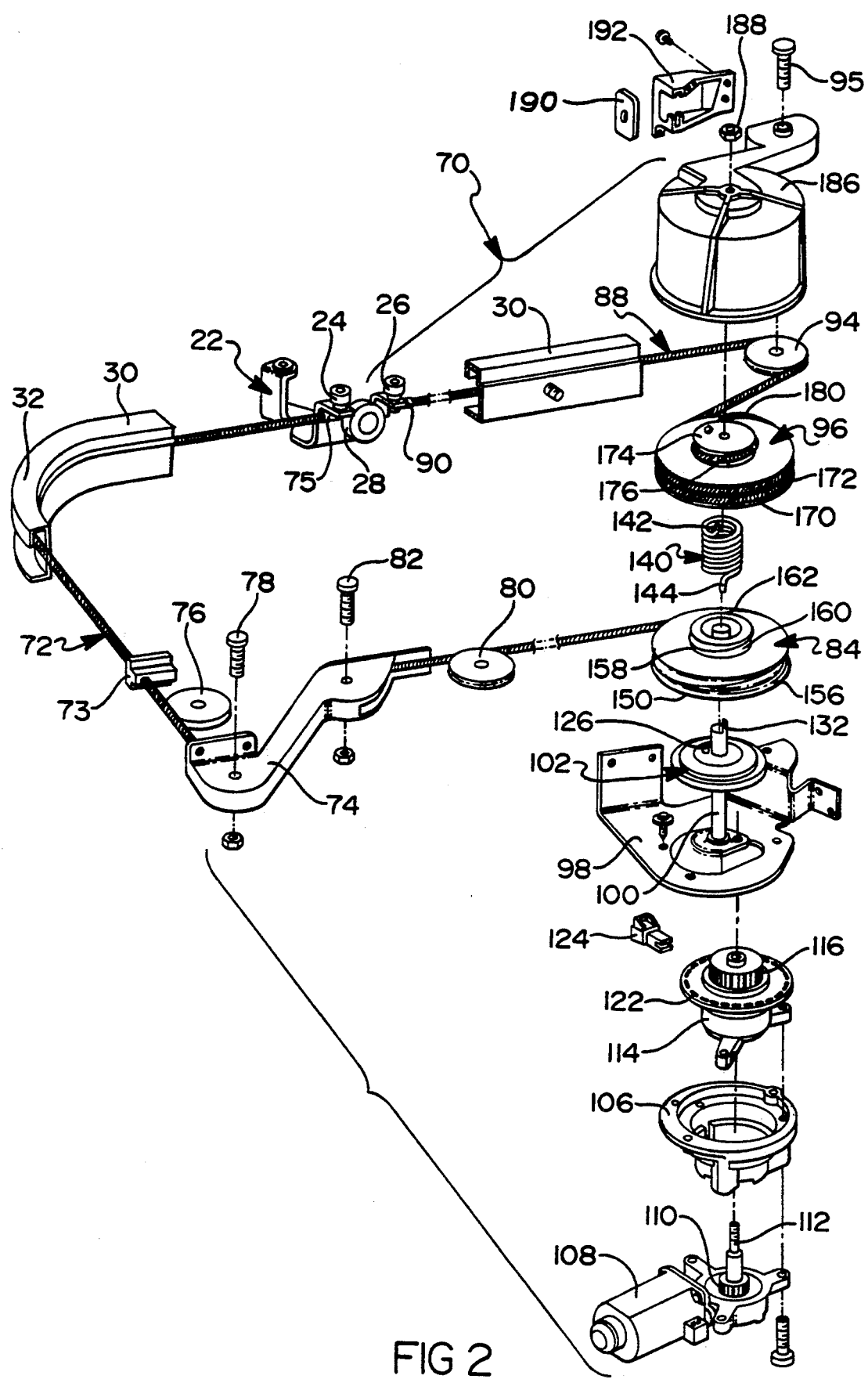
FIG. 2 is an exploded view of the door operating mechanism.

FIG. 3 is a sectional view taken through the apparatus of FIGS. 1 and 2, parts of which are broken away and in section.

Figure 4:
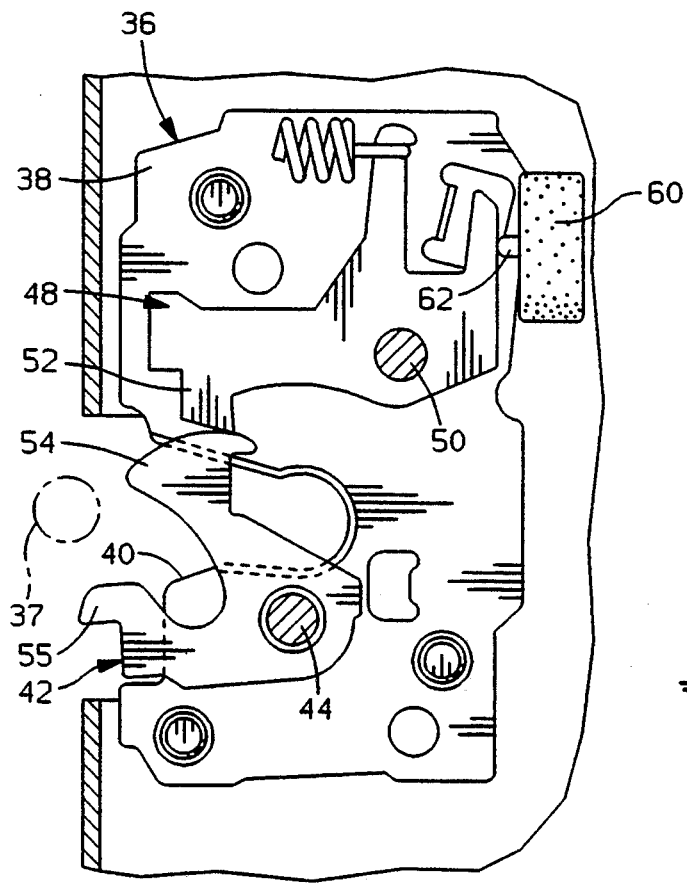

FIG. 4 is a view of a door latch in the apparatus of FIG. 1.

Figure 5:
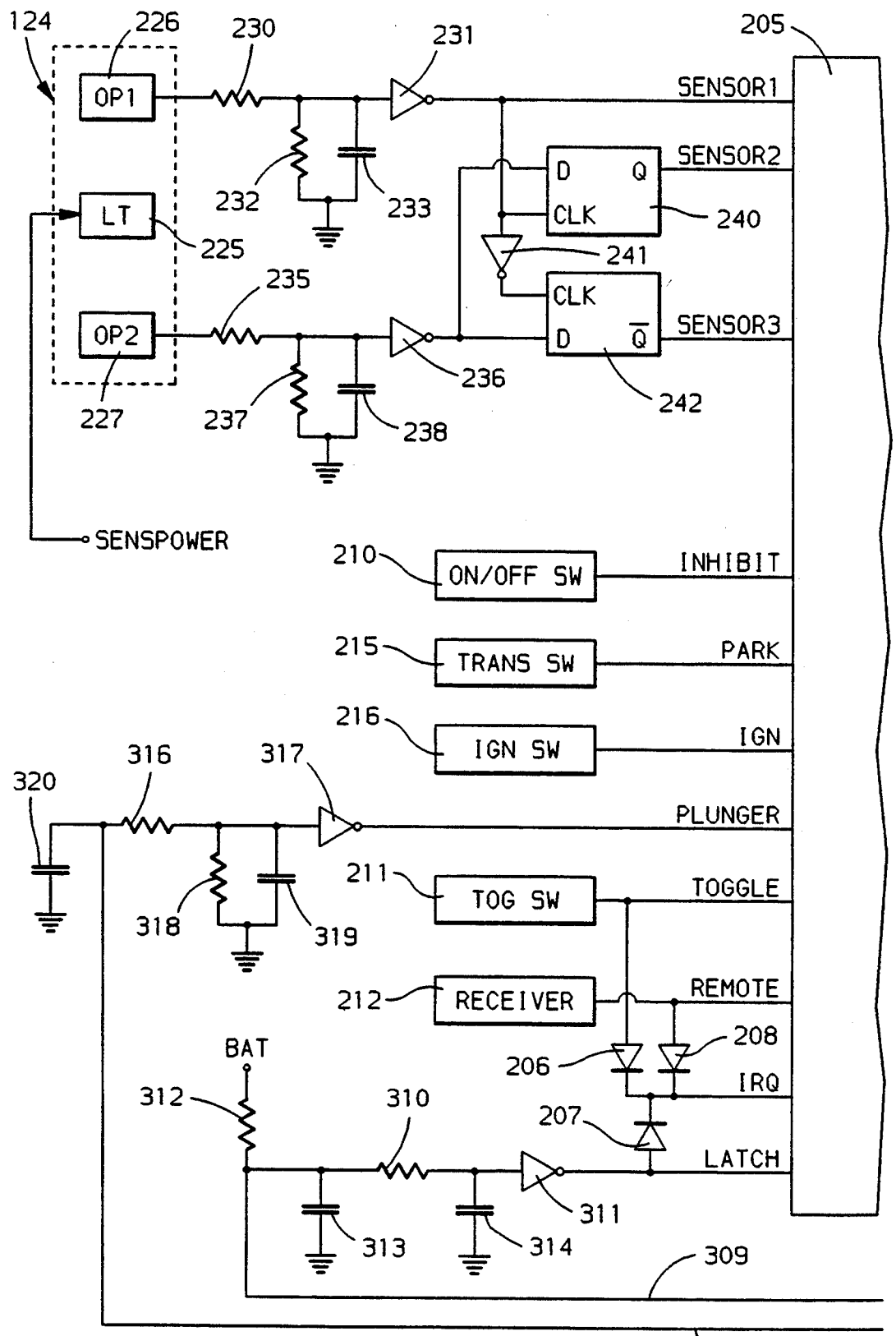
Figure 6:
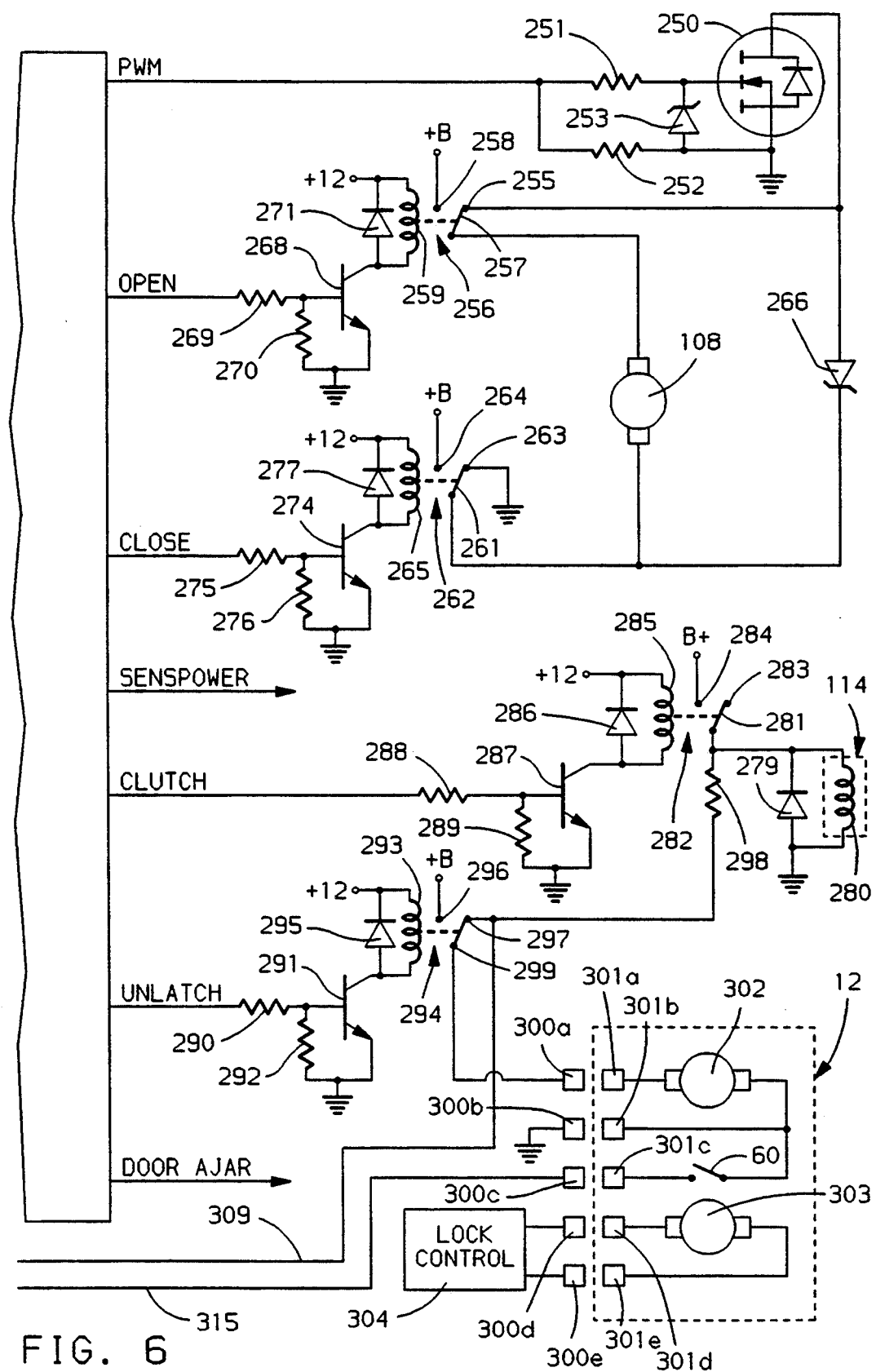

FIGS. 5 and 6 are mixed block/circuit diagrams of a controller for the power door closing mechanism of FIGS. 1-4.

Figure 7:
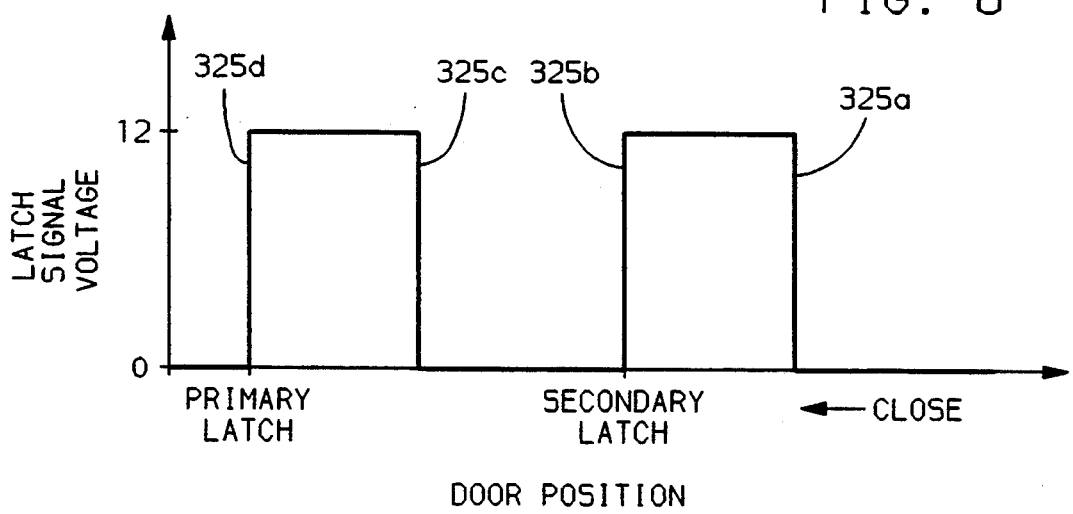

FIG. 7 is a graphical representation of a LATCH signal generated by the apparatus of FIGS. 4-6.

Figure 8:
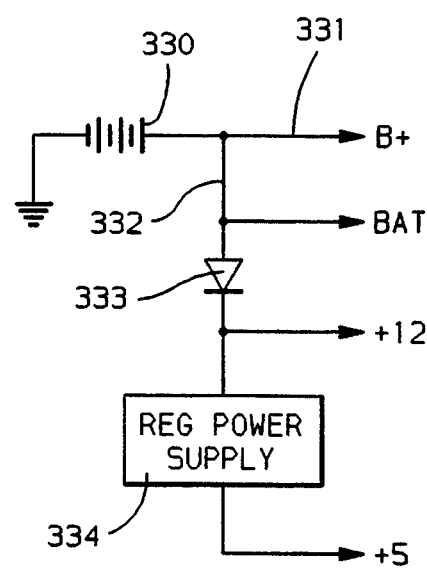

FIG. 8 is a circuit diagram of electrical power supply apparatus for the controller of FIGS. 5 and 6.

FIGS. 9A, 9B, 10, 11A, 11B, 12A, 12B, 13A, 13B, 13C, 13D, 14A, 14B, 15A, 15B, 15C, 15D, and 16 are flow diagrams illustrating the operation of the controller of FIGS. 5 and 6.

DESCRIPTION OF THE PREFERRED EMBODIMENT

Figure 9A:
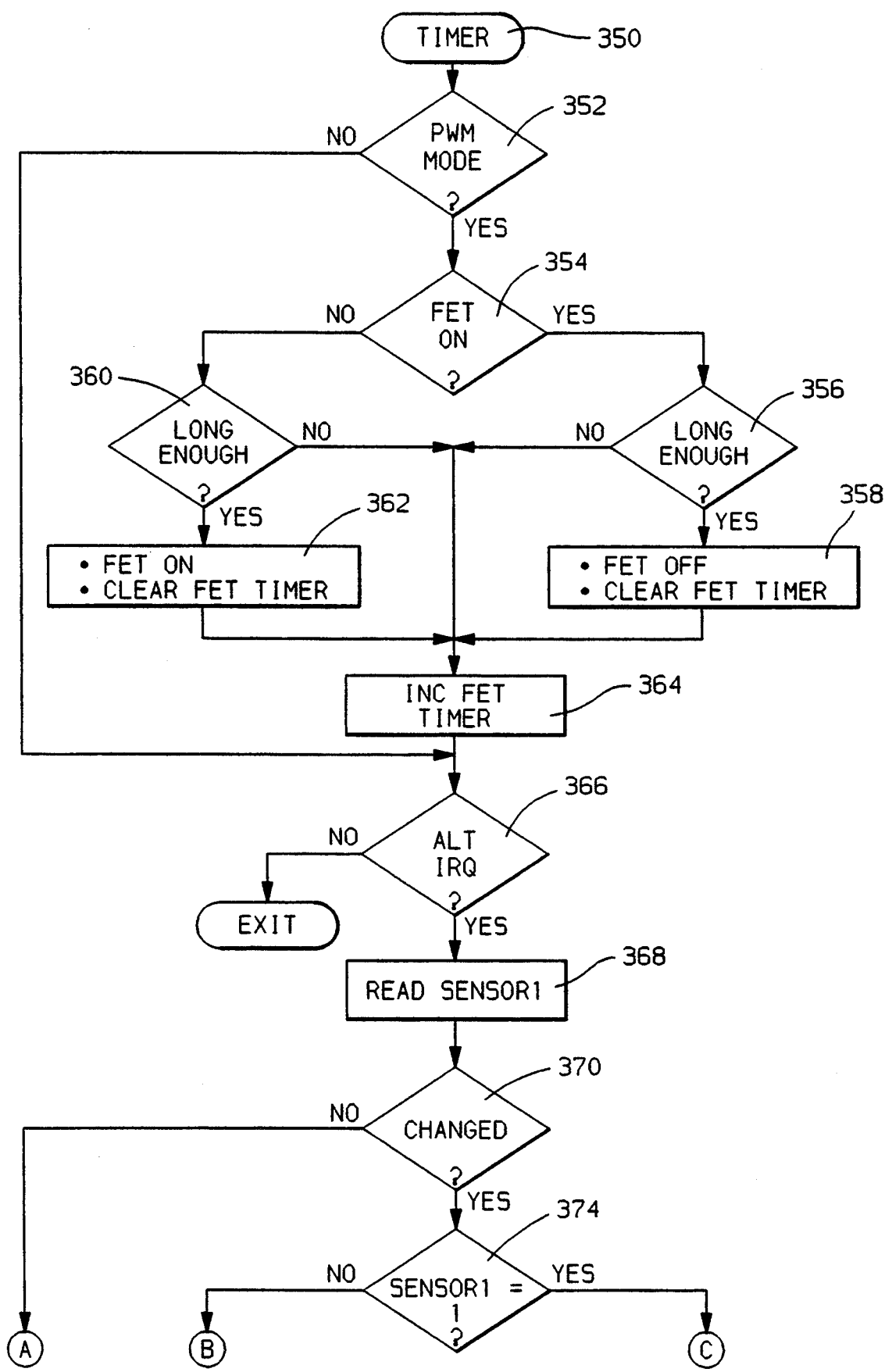
Figure 9B:
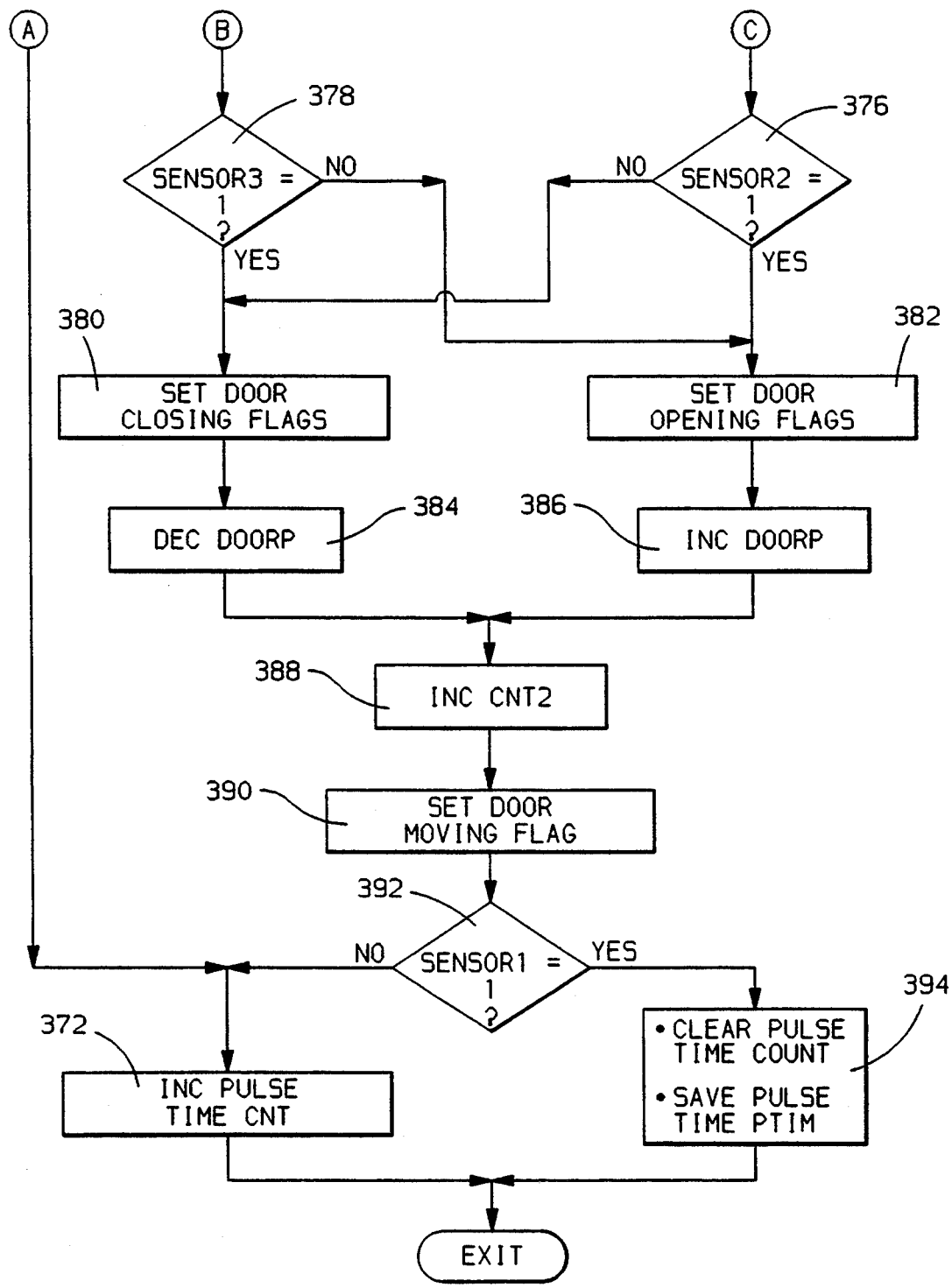
Figure 11A:
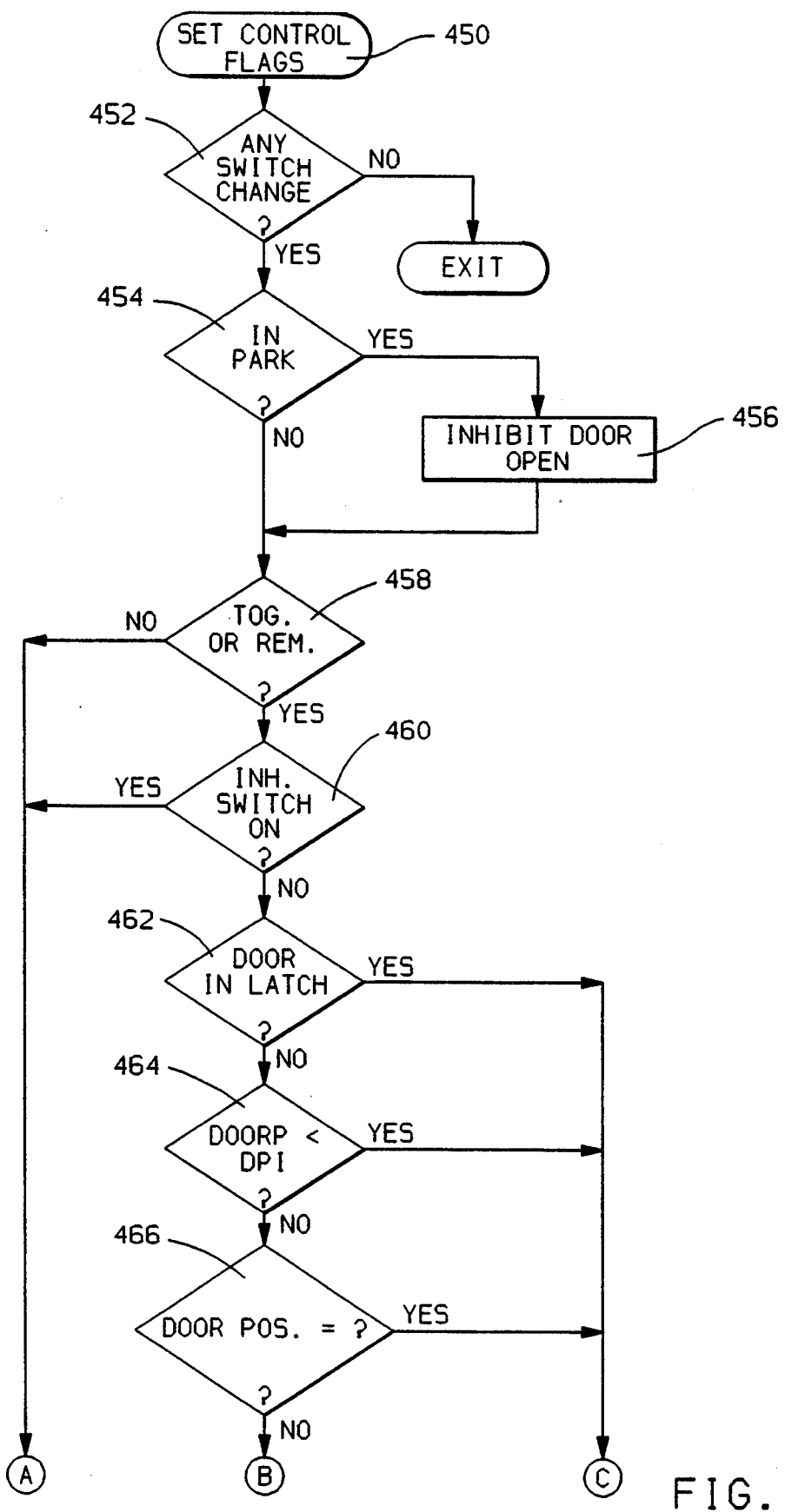
Figure 11B:
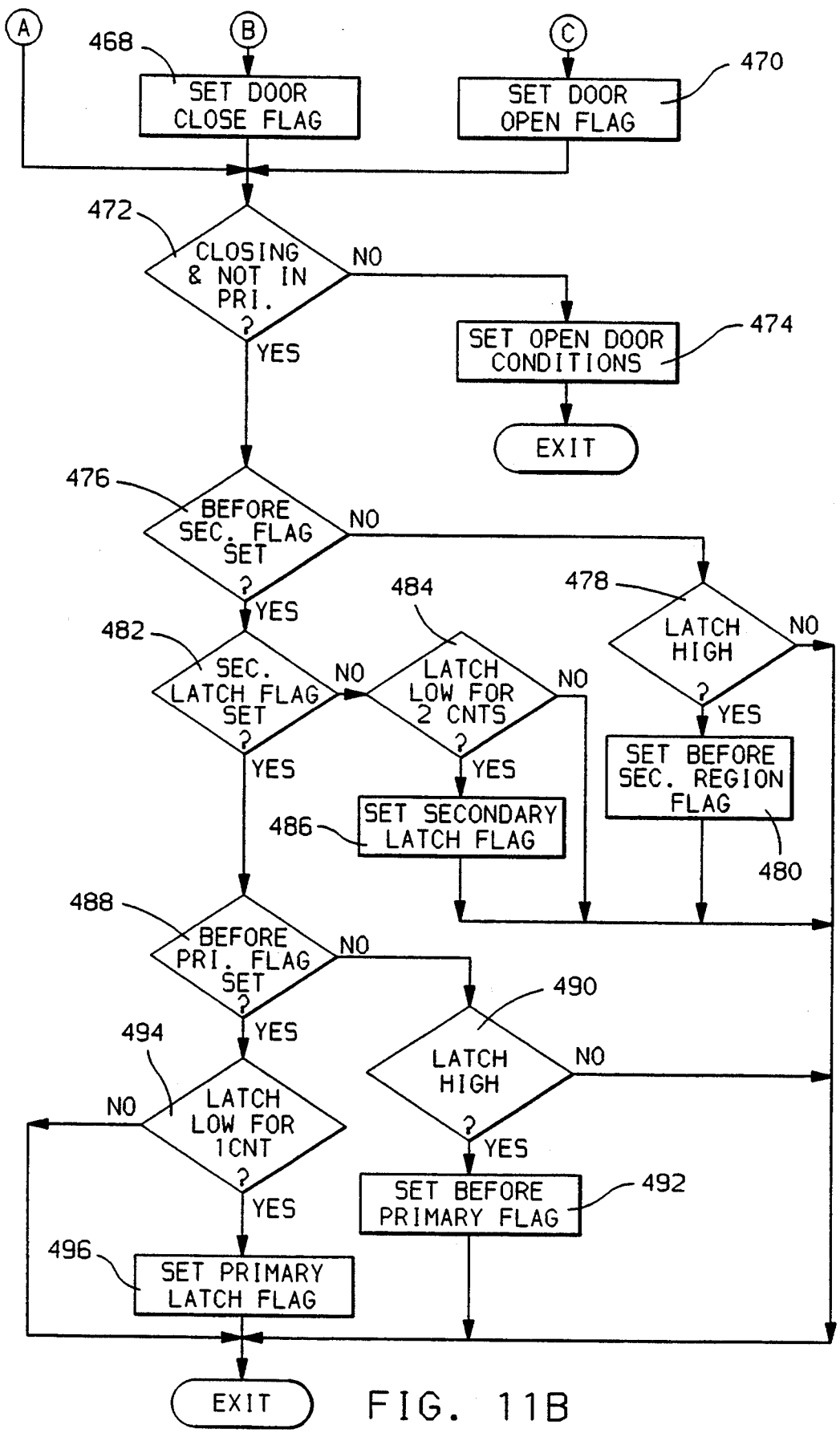
Figure 12A:
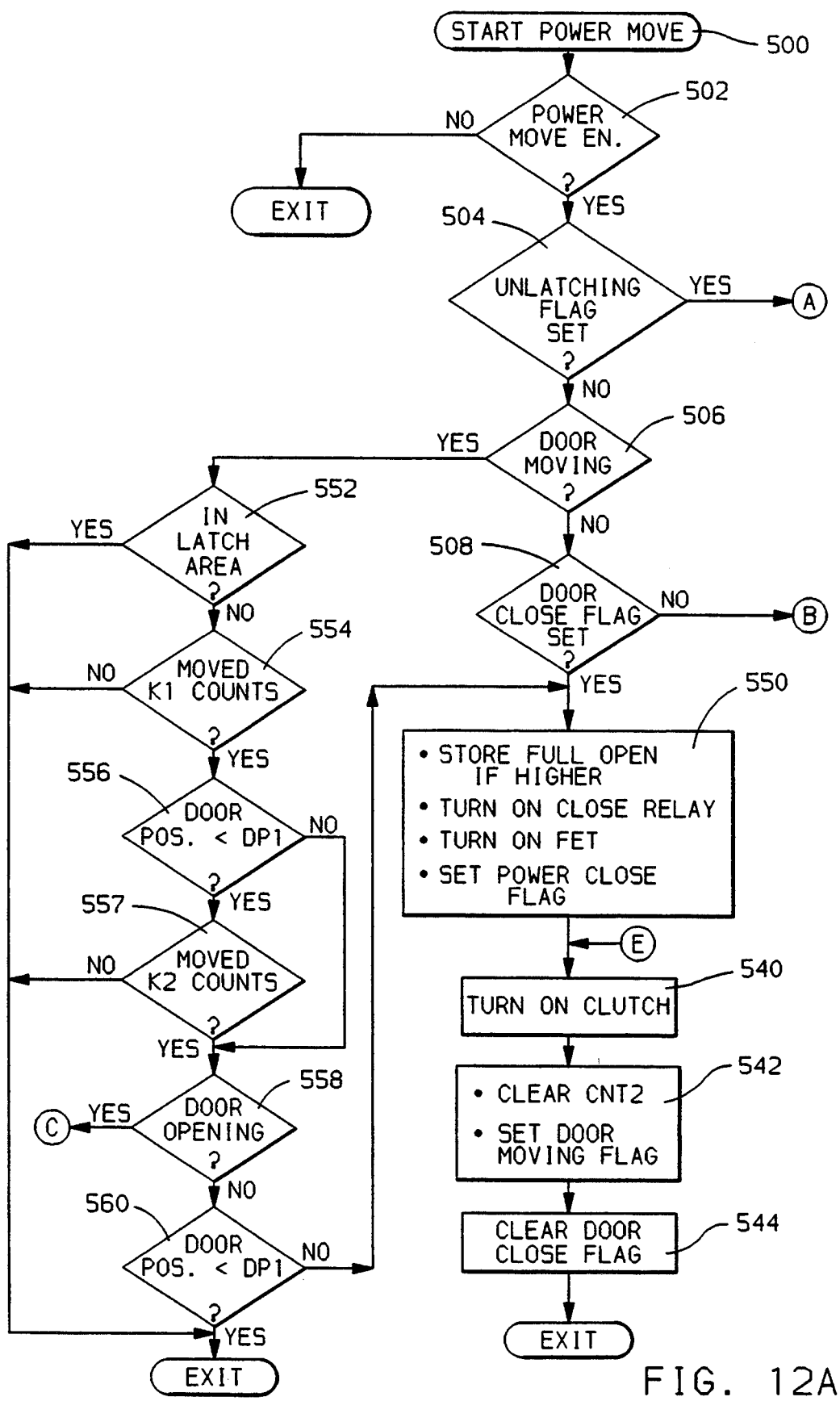
Figure 12B:
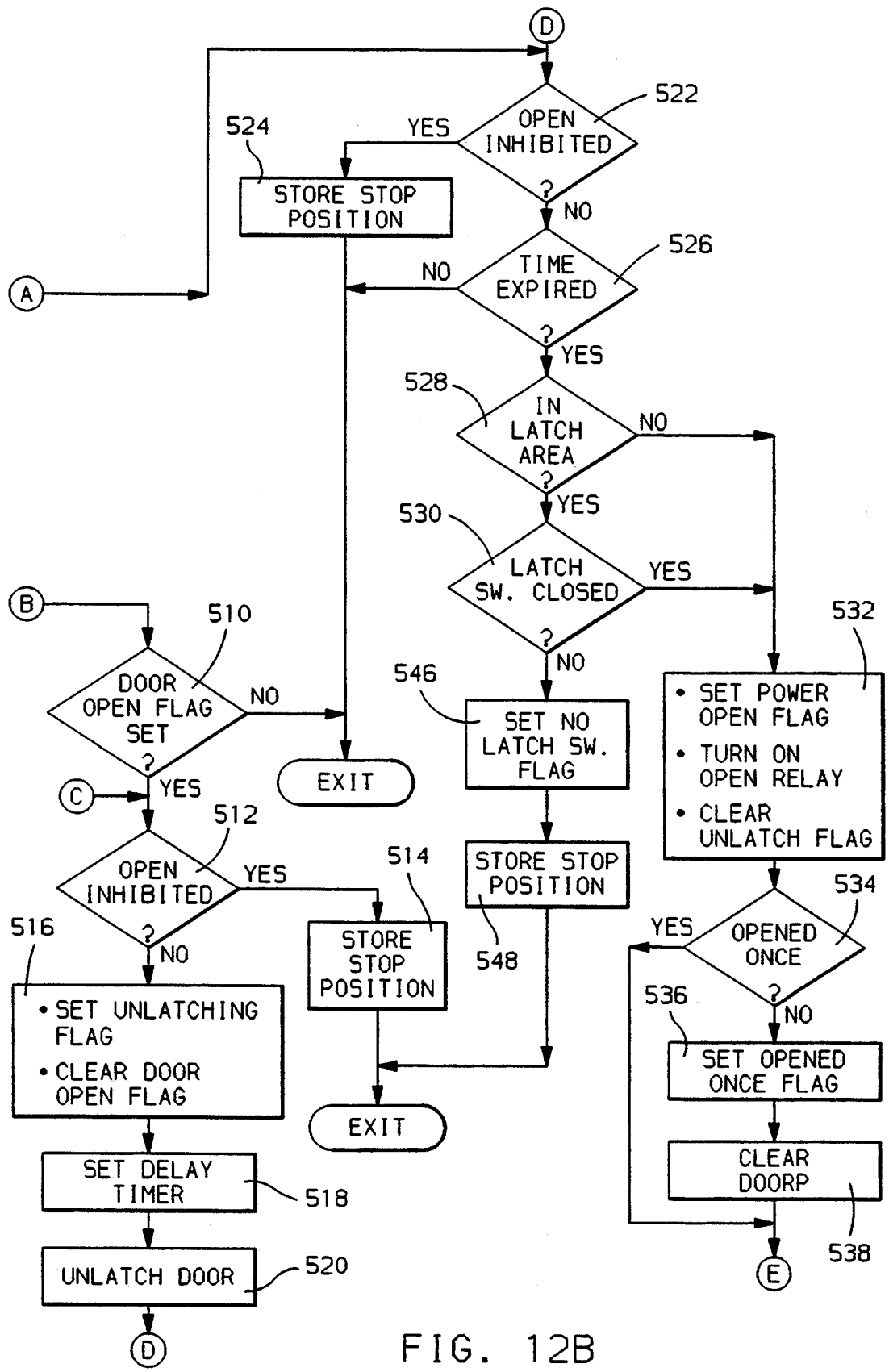
Figure 13A:
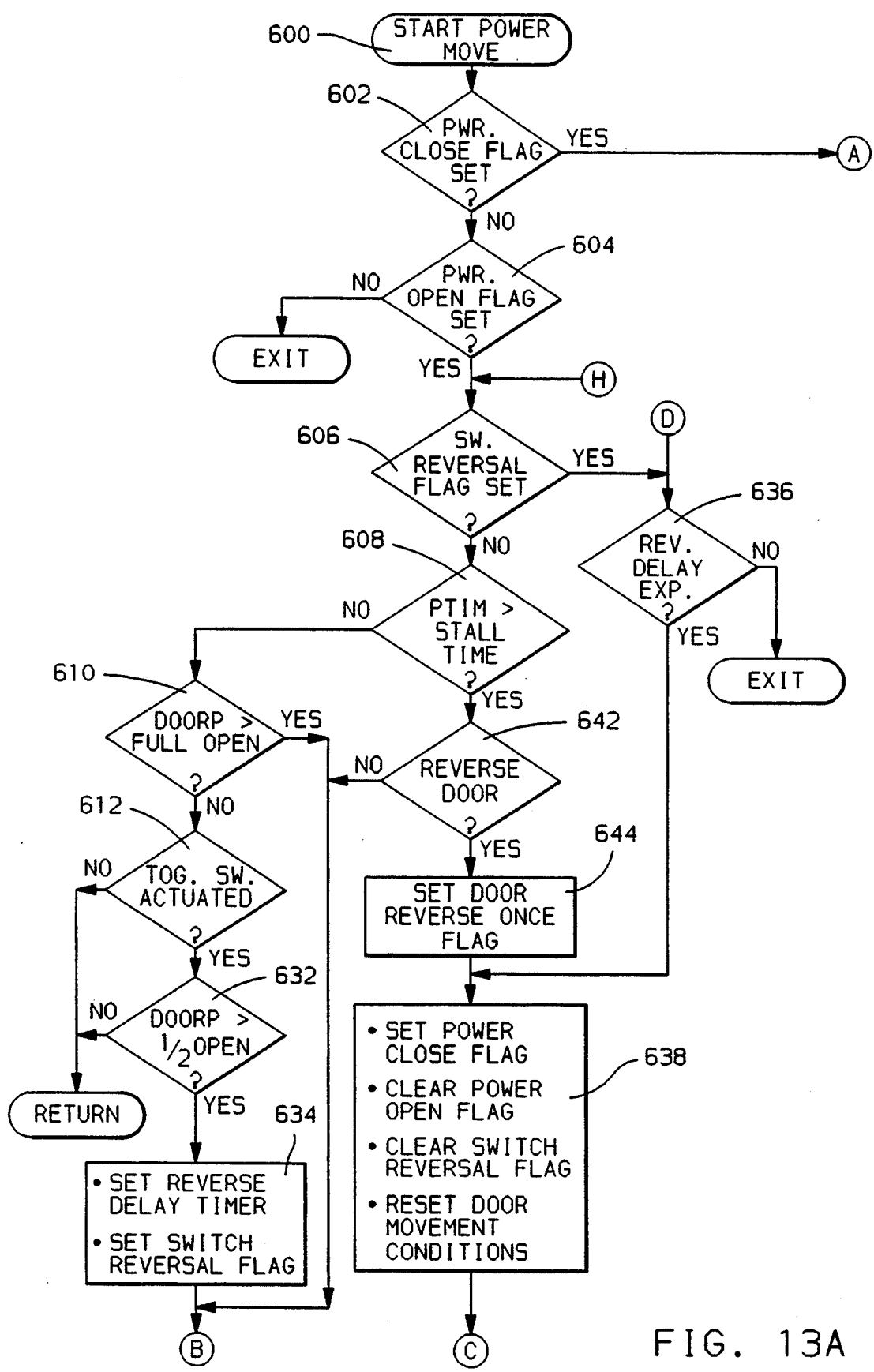
Figure 13B:
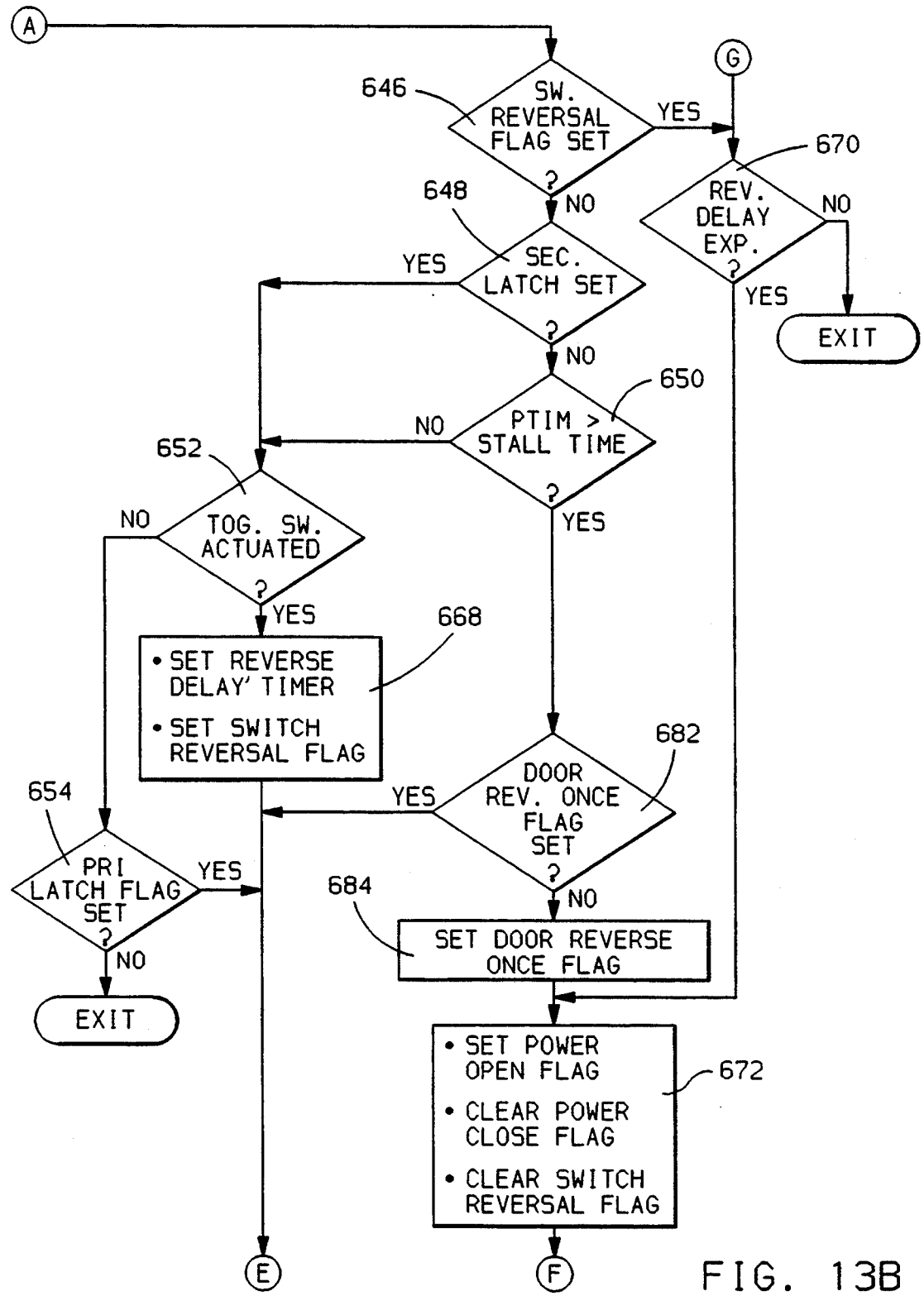
Figure 13C:
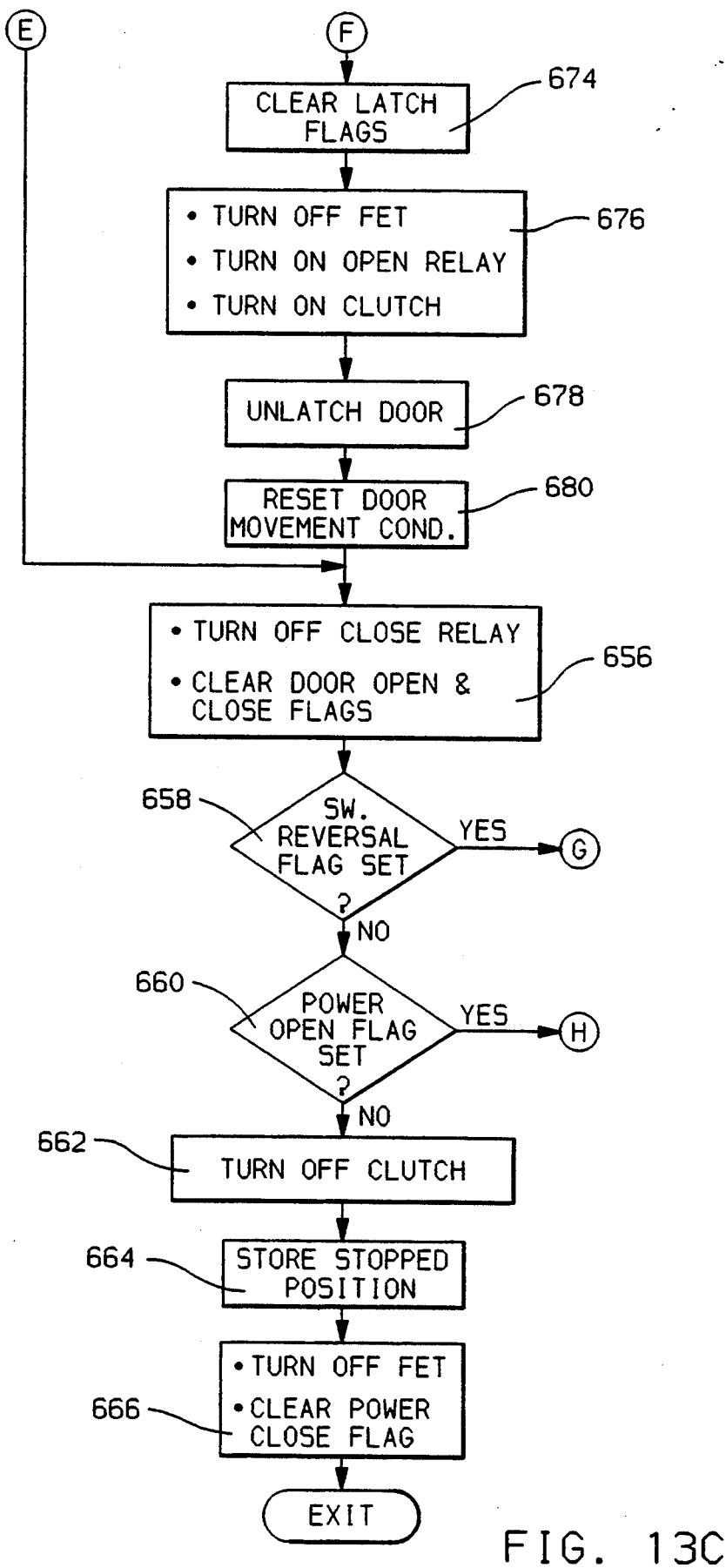
Figure 13D:
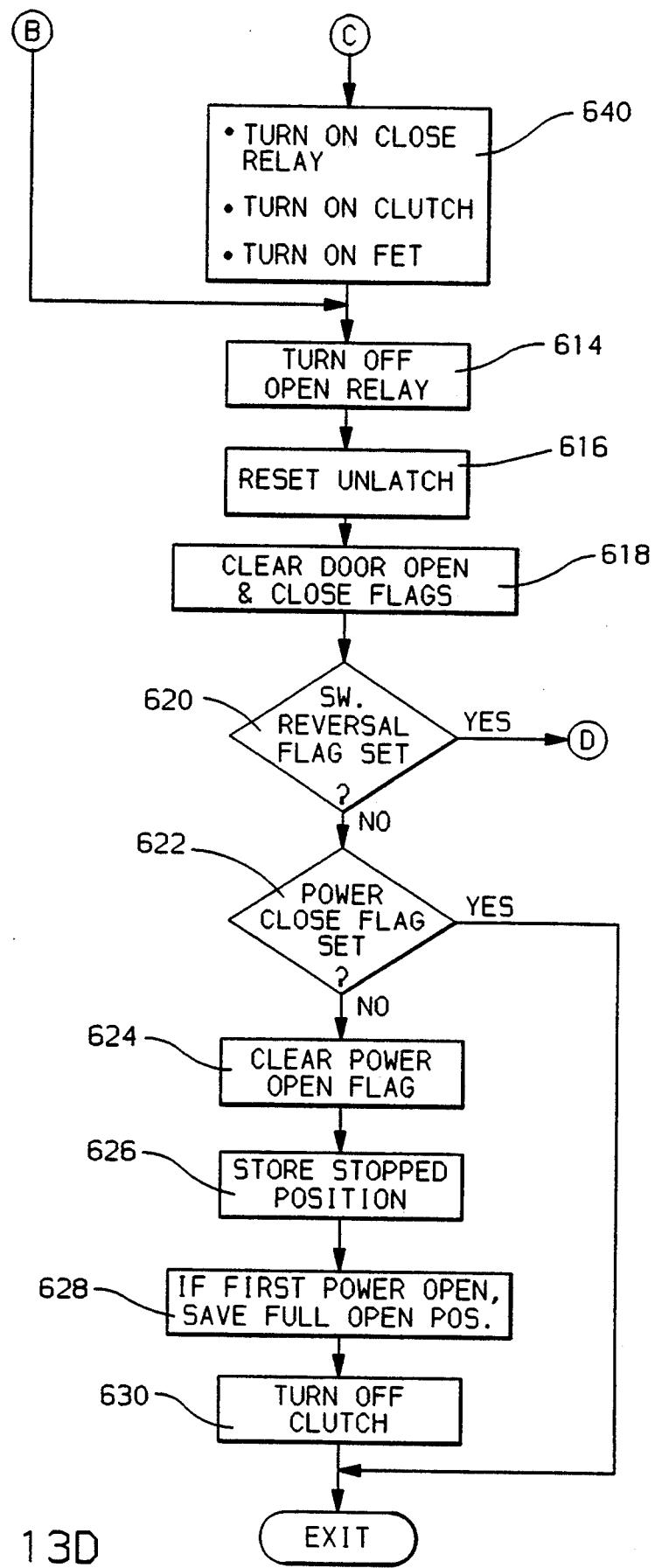
Figure 14A:
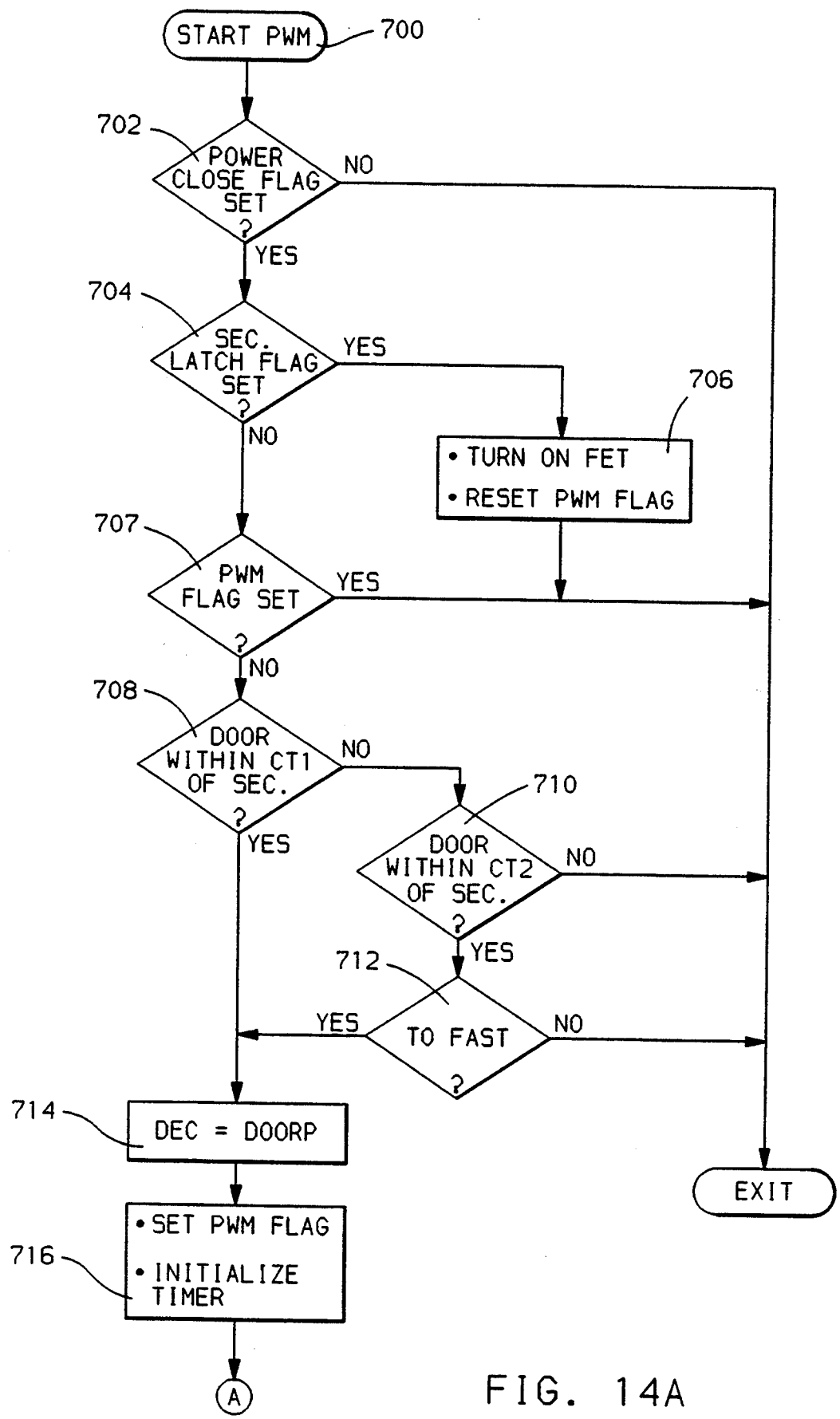
Figure 14B:
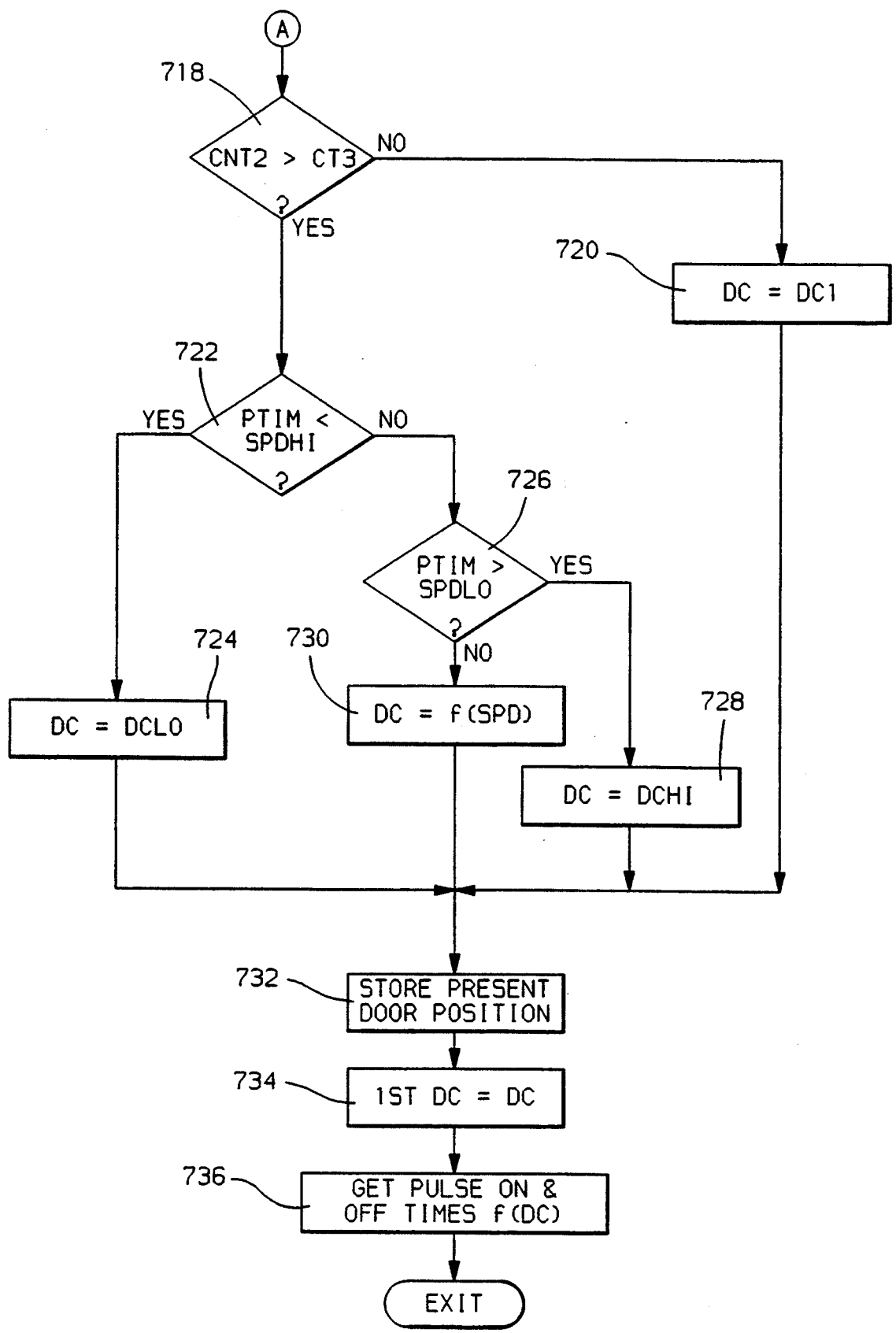
Figure 15A:
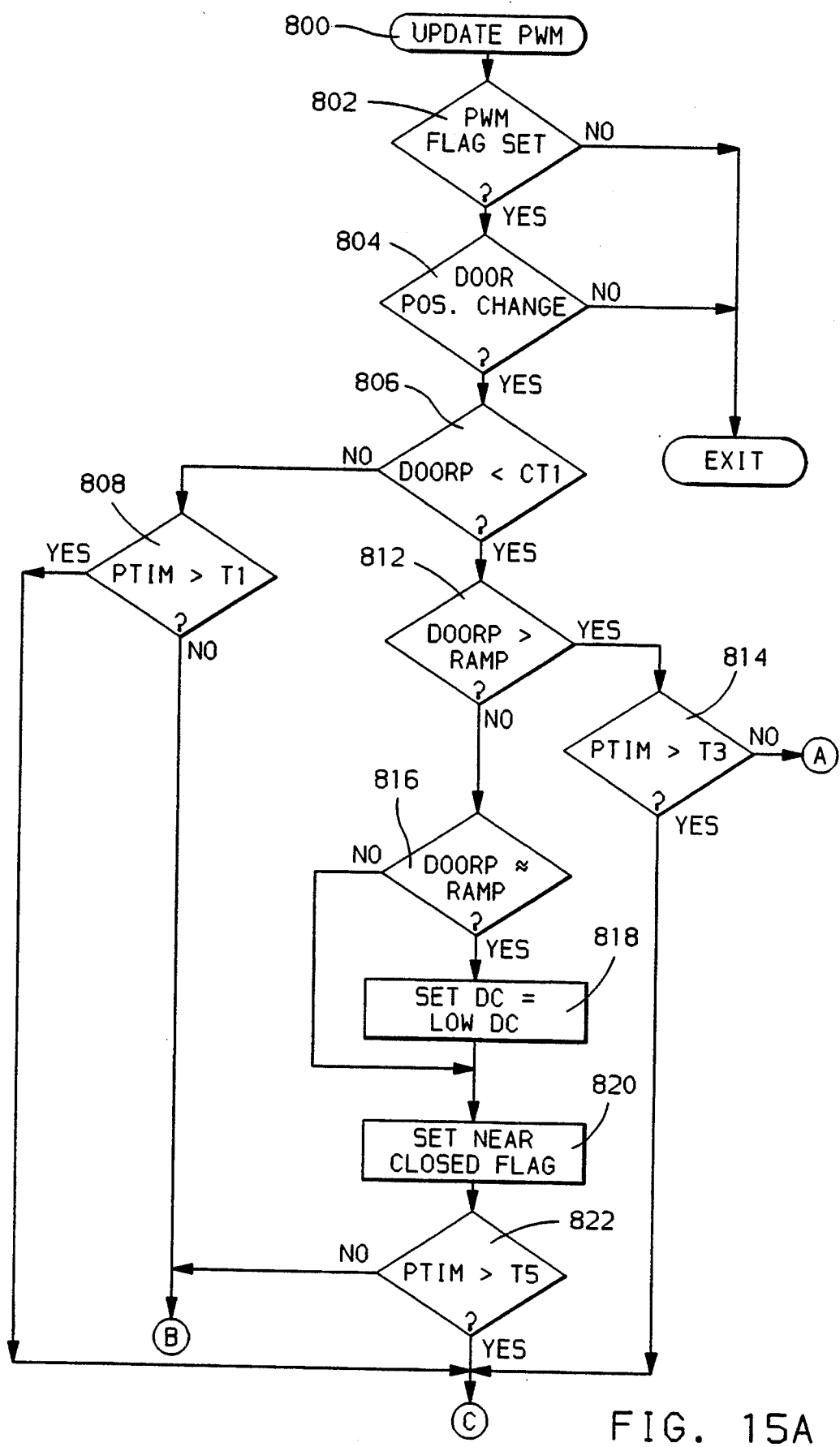
Figure 15B:
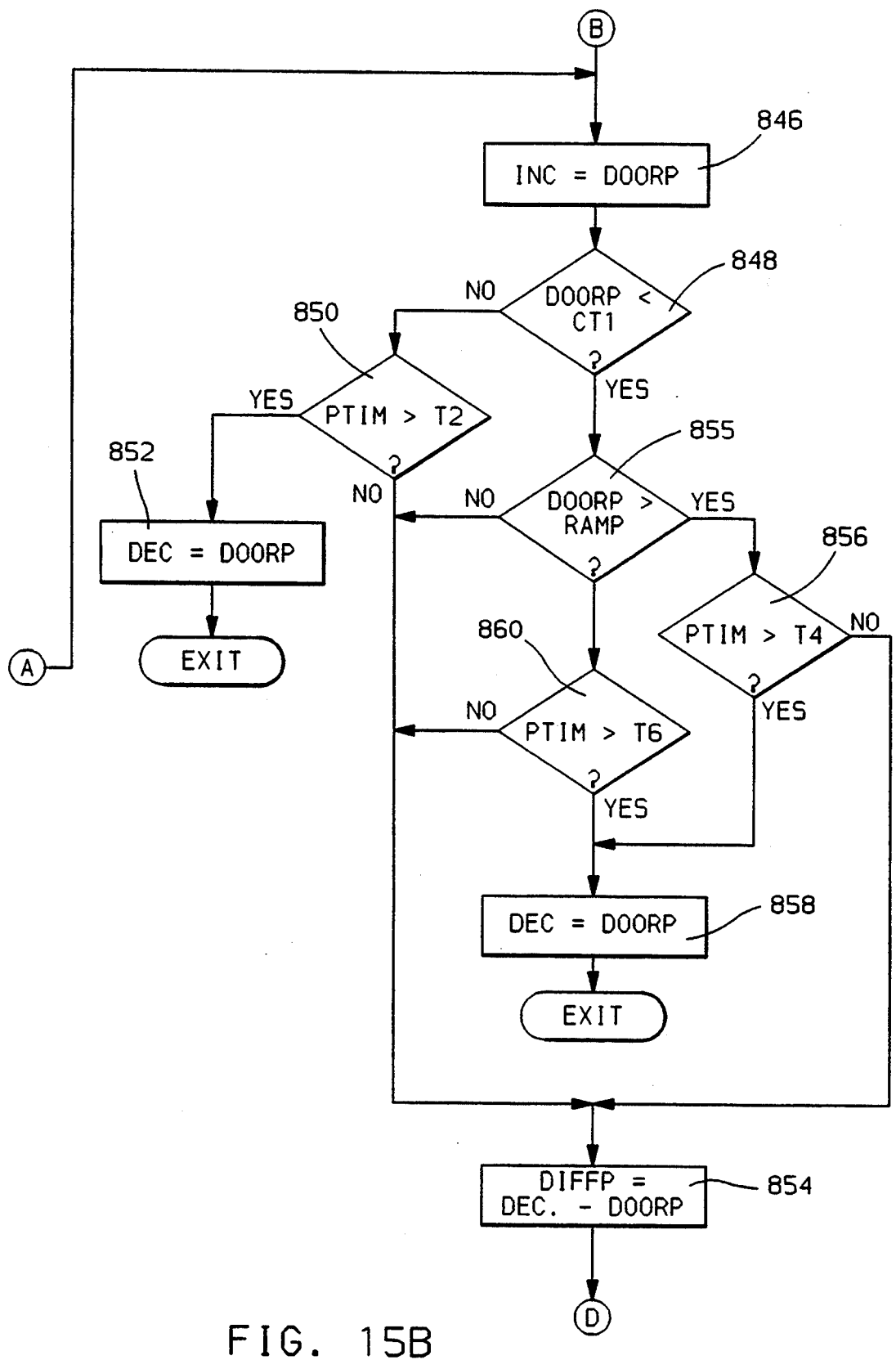
Figure 15C:
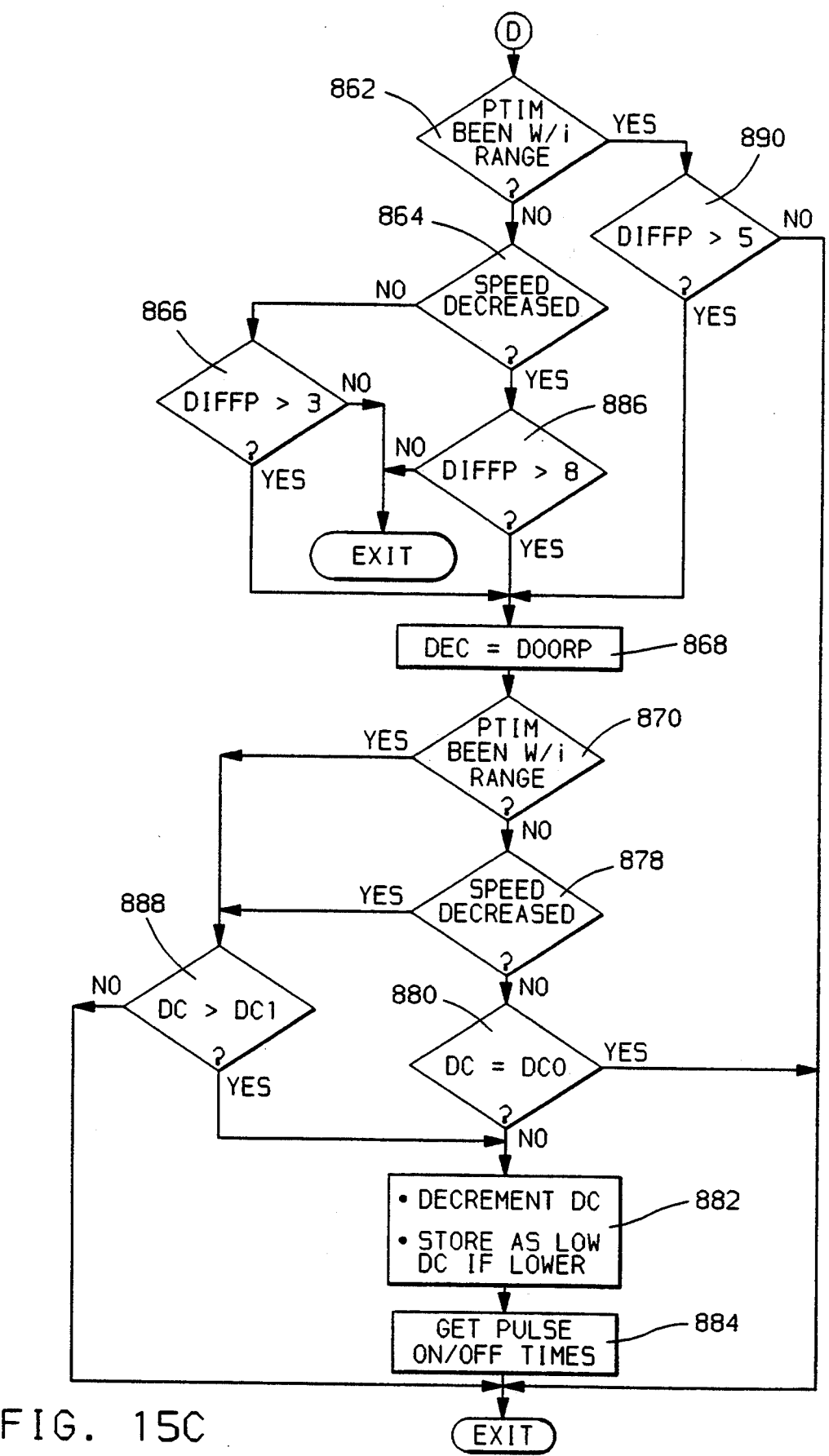
Figure 15D:
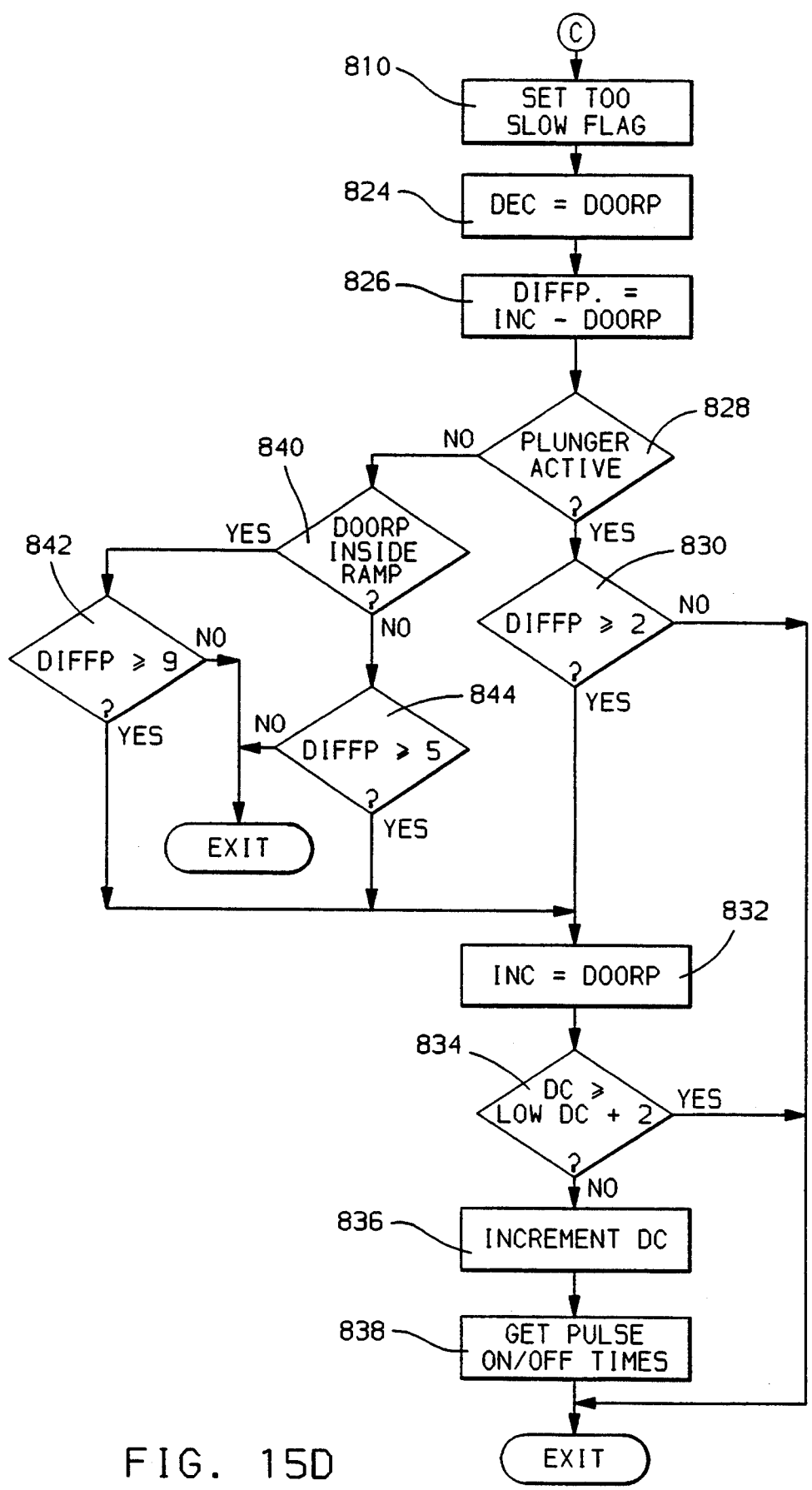

As used hereafter, FIGS. 9A and 9B are collectively referred to as FIG. 9, FIGS. 11A and 11B are collectively referred to as FIG. 11, FIGS. 12A and 12B are collectively referred to as FIG. 12, FIGS. 13A, 13B, 13C, and 13D are collectively referred to as FIG. 13, FIGS. 14A and 14B are collectively referred to as FIG. 14, and FIGS. 15A, 15B, 15C, and 15D are collectively referred to as FIG. 15.

FIG. 1 is a partial perspective view of a van type motor vehicle body 10 in which a door 12 is mounted for fore and aft sliding movement. An arm 14 reaches inboard at the bottom of door 12 and carries a roller which rides in a lower track 16 concealed beneath a floor 18. As best seen in FIG. 2, an upper arm 22 reaches inboard from door 12 and carries rollers 24, 26, and 28 which roll in an upper track 30 mounted on the side of body 10. FIG. 1 shows door 12 in an open position. Forward sliding movement of door 12 is enabled by the travel of the door mounted rollers within lower track 16 and upper track 30. Each of these tracks is curved inwardly at the forward end thereof, as shown in FIG. 2 at 32 with respect to upper track 30, so that the door glides inwardly to close the door opening as the door reaches a fully closed position. A sealing weatherstrip 34 is carried on door 12 and compresses against body 10 when the door reaches the closed position. A door latch 36 is carried by door 12 and latches with a striker 37 mounted on body 10 to latch door 12 in the closed position. Door latch 36 and striker 37 are shown in greater detail in FIG. 4.

As seen in FIG. 4, latch 36 includes a housing 38 having a throat 40 which captures striker 37 as the door approaches its closed position. A fork bolt 42 is mounted on housing 38 by a pivot 44. The entry of striker 37 into throat 40 causes fork bolt 42 to rotate clockwise to a secondary latched position in which a detent 48 mounted on housing 38 by a pivot 50 has a detent tooth 52 which engages a latch hook 54 of fork bolt 42. As detent tooth 52 rides up, over and down latch hook 54 into secondary latch, the resulting rotation of detent 48—first clockwise, then counterclockwise—causes a follower 62 of an electrical latch switch 60 to be moved first inwardly to change the state of latch switch 60 from open to closed and then outwardly again to change the state of latch switch 60 from closed back to open.

Further closing movement of door 12 from secondary latch causes further movement of striker 37 to the right in FIG. 4 within throat 40. This causes further clockwise rotation of fork bolt 42 into a primary latch position in which detent tooth 52 engages a primary hook 55 of fork bolt 42 and door 12 is fully closed with compression of sealing weatherstrip 34. As detent tooth 52 rides up, over and down primary hook 55 into primary latch, the resulting rotation of detent 48—first clockwise, then counterclockwise—once again causes follower 62 of latch switch 60 to be moved first inwardly to change the state of latch switch 60 from open to closed and then outwardly again to change the state of latch switch 60 from closed back to open.

Referring to FIGS. 2 and 3, the motor drive mechanism generally indicated at 70 is shown. A cable 72 has an end 75 connected to door arm 22. Cable 72 extends through the curved forward end 32 of track 30 and is threaded through grommets 73 and into a guide sleeve 74 mounted on the side wall of the vehicle body as shown in FIG. 1. The guide sleeve carries a pulley 76 mounted on axle 78 and a pulley 80 mounted on axle 82 which route cable 72 rearwardly to a first reel 84 which may be rotated in the clockwise direction to wind-up cable 72 and thereby pull the door forwardly towards the closed position.

A cable 88 has an end 90 connected to door arm 22 and extends through track 30 and around a pulley 94 mounted on axle 95 to route cable 88 to a second reel 96 which may be rotated counterclockwise to wind cable 80 and thereby pull door 12 rearwardly for opening.

Reels 84 and 96 are mounted on body 10 via a mounting bracket 98 bolted to the body and having a spindle 100 staked thereto. A drive gear 102 is seated on the spindle. Reel 84 is rotatably supported on drive gear 102. Reel 96 rests atop reel 84 and rotatably seats on spindle 100. A housing 106 is suspended from beneath bracket 98 and supports an electric motor 108 which drives a pinion gear 110 seated upon a stationary spindle 112 staked to bracket 98. An electromagnetic clutch assembly 114 is seated on spindle 112 and has an input gear, not shown, which meshes with pinion gear 110 and an output gear 116 which meshes with internal gear teeth 120 carried on drive gear 102. Output gear 116 carries a slotted disc 122 which underlies a stationary sensor 124.

A lost motion drive connection is provided between drive gear 102 and reel 84. The lost motion connection includes a drive lug 126 carried by drive gear 102, as seen in FIG. 2, and a complementary drive lug 128, which is carried by reel 84, as seen in FIG. 3. A lost motion connection is also provided between drive gear 102 and reel 96. A drive lug 132 is carried on the upper face of drive gear 102, as seen in FIG. 2, and is engagable with a complementary drive lug 134 carried on pulley 96 as seen in FIG. 3.

As seen in FIGS. 2 and 3, a tension retaining spring 140 is a coil spring and is seated in an annular opening in reels 84 and 96. An upper spring end 142 is anchored on reel 96 and a lower spring end 144 is anchored on reel 84. Tension retaining spring 140 acts to urge reel 96 in the counterclockwise winding direction and urge reel 84 in the opposite clockwise cable winding direction so that cables 72 and 88 are maintained in tension at all times.

As best seen in FIGS. 2 and 3, reel 84 has a large diameter portion 150 which has a spiral cable groove 156 and a small diameter portion 158 which has a spiral cable groove 160. A ramp groove 162 connects large diameter cable groove 156 with small diameter cable groove 160. The end of cable 72 is anchored on the outer diameter portion of reel 84.

Furthermore, as seen in FIGS. 2 and 3, reel 96 is constructed similarly to reel 84 and has a large diameter portion 170 with spiral cable groove 172 and a small diameter portion 174 with a spiral cable groove 176. A ramp groove 180 connects large diameter cable groove 172 and small diameter cable groove 176. As shown in FIG. 2, the end of cable 88 is attached to reel 96 on the small diameter portion 174. As best seen in FIG. 2 a cover 186 is installed over reels 84 and 96 and is retained by a nut 188. Cable 88 exits housing 86 through a grommet 190 supported by outlet 192.

In the drawings, the door 12 is shown in the full open position. Cable 88 is fully wound up on the reel 96. The cable 72 is fully unwound from the reel 84. The tension retaining spring 140 acts between the reels 84 and 96 urging reel 96 counterclockwise and urging reel 84 clockwise so that the cables 72 and 88 are both retained in tension.

When a vehicle user wishes to close door 12, an electrical circuit, to be described herein, is activated to energize drive gear 102 via motor 108, pinion gear 110, electromagnetic clutch 114, and output gear 116. Clockwise rotation of drive gear 102 will cause its drive lug 126 to engage the complementary drive lug 128 of reel 84 and rotate reel 84 in the clockwise direction to wind up cable 72, which in turn pulls door 12 forward toward the closed position. The cable is progressively wound upon spiral groove 156 of large diameter portion 170 of reel 84. As the door nears the closed position, cable 72 traverses ramp groove 162; and further rotation of reel 84 causes the cable to be wound in cable groove 176 of small diameter portion 174 of reel 84.

Accordingly, the winding of the cable 72 on large diameter portion 170 of reel 84 provides a low force/speed relationship between motor 108 and door 12 over the greater range of travel away from the closed position. As door 12 approaches the closed position, the winding of cable 72 on small diameter portion 174 provides a higher force/speed relationship between motor 108 and door 12 to generate a higher closing force to overcome the opposing force of members such as weatherstrip 34 which engage door 12 as it approaches the closed position.

It will be understood that the forward movement of the door extracts cable 86 from reel 96 against the bias of tension retaining spring 140. Tension retaining spring 140 acts between the two reels so that the spring works to constantly maintain a predetermined level of tension in cable 88 as it is unwound from reel 96.

In a similar manner, door opening is obtained by first unlatching and then by activating motor 108 in the door opening direction and activating electromagnetic clutch 114 so that motor 108 drives drive gear 102 in the counterclockwise direction. Drive lug 132 of drive gear 102 engages drive lug 134 of pulley 96 to drive that pulley in the counterclockwise direction and thus wind cable 88 thereon. Cable 88 thus pulls door 12 in the opening direction.

Referring to FIGS. 5 and 6, a programmed digital processor 205 may be, for example, a Motorola (R) MC68HC05C4, which comprises a single chip microprocessor including CPU, RAM, ROM and I/O apparatus. Standard connections for an external crystal, watchdog circuit, etc. are not shown, as they will be well known to those using such processors; however, input and output connections specific to this system are shown and identified, with inputs in FIG. 5 and outputs in FIG. 6.

Referring specifically to FIG. 5, an ON/OFF switch 210 provides a binary INHIBIT input signal to processor 205. The ON/OFF switch may be located conveniently to a vehicle operator and its INHIBIT signal is used to enable or inhibit operation of the powered door operating apparatus via a toggle switch (TOG SW) 211, which provides a binary input signal TOGGLE to processor 205. Toggle switch 211 may be located within the vehicle near door 12 conveniently to one desiring to open door 12 from inside the vehicle. Alternatively, or in addition, a toggle switch 211 may be located conveniently to a vehicle operator. The TOGGLE input is used to initiate powered operation of door 12 in either the open or close directions or, in some circumstances, to reverse door direction under the control of an operator. A RECEIVER 212 receives a remote door opening or closing signal from a transmitter outside the vehicle by infrared, electromagnetic or other radiation and generates a binary REMOTE input to processor 205 which is used similarly to the TOGGLE input, except that it is not affected by the INHIBIT signal. Examples of such remote opening systems are well known in the art; and RECEIVER 212 may include known decoding means for use in generation of the REMOTE signal.

Processor 205 includes an interrupt IRQ input which, when it receives a predetermined voltage change, generates an interrupt request within processor 205. At least one use of such a request in this system is to "wake up" the processor to its full function from a "sleep" state in which many system functions are suspended to save power, etc. when door closing is not desired. Toggle switch 211 and RECEIVER 212 are each connected to the IRQ input, through isolating diodes 206 and 208 respectively, so as to initiate such a "wake up" of the system upon the activation of either.

A transmission switch (TRANS SW) 215 provides a binary PARK input to processor 205 to indicate when the vehicle transmission is in a mode providing no vehicle movement, such as the park condition of a standard vehicle automatic transmission. The PARK signal is used to allow powered door operation when the vehicle is not moving and prevent such operation in the opening direction when the vehicle is moving or potentially moving. An ignition switch (IGN SW) 216 provides a binary IGN signal to processor 205 to indicate the ignition switch condition. A LATCH input provides signals to processor 205 which can be interpreted to indicate the status of latch 36 of door 12. The LATCH input is also connected through an isolating diode 207 to the IRQ input to provide a "wake up" function when latch 36 of door 12 changes its latch condition. The origin and interpretation of the LATCH input will be described at later points in this description. A PLUNGER input to processor 205 provides a binary indication of contact between electrical contacts in the main portion of vehicle body 10 and door 12.

Sensor 124 is provided with an internal light source (LT) 225 which provides light under the control of a signal SENSPOWR, which is obtained from processor 205 as shown in FIG. 6. Sensor 124 further comprises two light sensors 226 (OP1) and 227 (OP2) arranged with light source 225 and a rotatable slotted disk 122 (FIG. 2) in a standard quadrature detector arrangement so that, for example, if the slotted disk comprises alternating solid and open sections of equal arc, while sensor 226 is in the middle of a solid section, sensor 227 is on the border between solid and open sections. Such an arrangement provides signals which can be interpreted to sense rotational speed (or position) and direction. Sensor 124 is mounted in a stationary manner; and slotted disk 122 is rotated by the door driving output gear 116 of clutch 114.

Light sensor 226 is connected through a series resistor 230 (4.7K) to an inverting buffer 231, with a resistor 232 (100K) and capacitor 233 (100 pF) connected in parallel to ground from the input of buffer 231. Likewise, light sensor 227 is connected through a series resistor 235 (4.7K) to an inverting buffer 236, with a resistor 237 (100K) and capacitor 238 (100 pF) connected in parallel to ground from the input of buffer 236. The output of buffer 231 provides a SENSOR1 input to processor 205 and is connected directly to the CLK input of a flip-flop 240 and through an inverting buffer 241 to the CLK input of a flip-flop 242. Although not shown, the R and S inputs of flip-flops 240 and 242 are grounded. The output of buffer 236 is connected to the D inputs of flip-flops 240 and 242. The Q output of flip-flop 240 provides an input SENSOR2 to processor 205; while the NOTQ output of flip-flop 242 provides an input SENSOR3 to processor 205. SENSOR1 provides a pulse signal which can be interpreted by processor 205 to indicate rotational position, and therefore speed, of motor drive mechanism 70 when the clutch is engaged or to indicate manual door movement when the clutch is not engaged. SENSOR2 and SENSOR3 provide pulse signals indicating movement direction with greater resolution than that provided by a single direction signal, so that direction reversal can be sensed sooner.

Referring to FIG. 6, the SENSPOWR signal which controls light source 225 in FIG. 5 is generated as a binary output of processor 205. In addition, a DOOR AJAR signal is generated by processor 205 when door 12 is out of primary latch position. This signal can be used, if desired, to activate a door ajar lamp or similar warning signal.

A PWM output from processor 205 is used to control a 50 amp power FET 250. The binary PWM signal is connected through a resistor 251 (1K) to the gate of FET 250 and through a resistor 252 (10K) to ground. The source of FET 250 is grounded and its gate is protected by a 5.1 volt zener diode 253 connected to ground.

The drain of FET 250 is further connected to the normally closed contact 255 of a relay 256 having an armature 257, a normally open contact 258 connected to voltage B+, and an activating coil 259. Armature 257 of relay 256 is connected through the armature circuit of electric motor 108 to an armature 261 of a relay 262 having a grounded normally closed contact 263, a normally open contact 264 connected to voltage B+, and an activating coil 265. A protective zener diode 266 is connected between armature 261 of relay 262 and normally closed contact 255 of relay 256.

An activating circuit for relay 256 comprises an NPN transistor 268 having a grounded emitter, a base receiving a binary OPEN output signal through a resistor 269 (470 ohm) from processor 205 and a collector connected through activating coil 259 to voltage +12. The activating circuit further comprises a resistor 270 (680 ohm) from the base of transistor 268 to ground and a freewheeling diode 271 across activating coil 259. Likewise, an activating circuit for relay 262 comprises an NPN transistor 274 having a grounded emitter, a base receiving a binary CLOSE output signal through a resistor 275 (470 ohm) from processor 205 and a collector connected through activating coil 265 to voltage +12. This activating circuit further comprises a resistor 276 (680 ohm) from the base of transistor 274 to ground and a freewheeling diode 277 across activating coil 265.

A high OPEN output of processor 205 will activate relay 256 to provide current at +12 volts through armature 257, the armature of drive motor 108 and relay 262 to drive motor 108 in the door opening direction (however, door 12 is driven only when the clutch is activated, as described below). Alternatively, with relay 262 activated by the CLOSE signal from processor 205, motor 108 is connected in series with voltage B+ and FET 250. Processor 205 may thus control motor 108 in the door closing direction by its PWM output: providing continuous or, alternatively, pulse width modulated control.

Clutch 114 is electromagnetically actuated and includes an actuating coil 280, which is connected between ground and an armature 281 of a relay 282. A freewheeling diode 279 is connected across coil 280. Relay 282 further comprises a normally closed contact 283, a normally open contact 284 connected to voltage B+ and an activating coil 285 with a parallel freewheeling diode 286. An activating circuit for relay 282 comprises an NPN transistor 287 having a grounded emitter and a base connected to a CLUTCH output of processor 205 through a resistor 288 (470 ohm) and to ground through a resistor 289 (680 ohm). Activating coil 285 is connected between the collector of transistor 287 and voltage B+. The CLUTCH output of processor 205 activates clutch 114 through the circuit described above.

An UNLATCH output of processor 205 is connected through a resistor 290 (470 ohm) to the base of an NPN transistor 291 having a grounded emitter and a resistor 292 (680 ohm) connected from its base to ground. The collector of transistor 291 is connected to voltage B+ through the activating coil 293 of a relay 294 and a parallel freewheeling diode 295. Relay 294 further comprises a normally open contact 296 connected to voltage B+, a normally closed contact 297 connected through a resistor 298 (470 ohm) to armature 281 of relay 282, and an armature 299. Relay 294 is used to control an electrically powered unlatching mechanism for latch apparatus 36.

Latch apparatus 36, as previously described, is located in the movable door 12; however, there is no source of electric power in door 12. Therefore, electric power and communication is provided to door 12 only in its closed position. A set of five stationary electrical contacts 300a–300e are disposed in the door frame of body 10 for contact by a set of five spring-loaded, plunger-type electrical contacts 301a–301e on door 12. Plunger contacts 301a–301e are each aligned to contact the corresponding one of stationary contacts 300a–300e as door 12 nears its closed position; and each compresses against its internal spring force as door 12 fully closes. Stationary contact 300a is connected to armature 299 of relay 294; and stationary contact 300b is connected to ground. In door 12, an unlatch motor 302, which activates the unlatch mechanism, is connected between plunger contacts 301a and 301b. Latch switch 60 is connected between plunger contact 301c and the junction of plunger contact 301b and unlatch motor 302. Door 12 may also include a power lock apparatus with an unlock motor 303 connected between plunger contacts 301d and 301e and with a LOCK CONTROL apparatus 304 in body 10 connected to stationary contacts 300d and 300e.

Stationary contact 300c is connected through line 309 (continued in FIG. 5), resistor 310 (100K) and inverting buffer 311 to the LATCH input of processor 205. Stationary contact 300c is further connected through a resistor 312 (470 ohm) to voltage BAT, and through a capacitor 313 (220 pF) to ground. A capacitor 314 (0.01 uF) is connected to ground from the input of inverting buffer 311. The plunger contacts 301a–301e are engaged with the stationary contacts 300a–300e throughout a small range of movement of door 12 adjacent its closed position which includes both secondary and primary latch. Latch apparatus 36 is shown in FIG. 4; and the latch switch signal is shown in FIG. 7, in which the signal voltage trace represents the voltage of the LATCH signal provided to processor 205 as a function of the position of door 12. As door 12 closes, after the plunger contacts make contact with the stationary contacts, latch switch 60 closes and reopens as door 12 enters secondary latch position, as described with reference to FIG. 4. With reference to FIG. 7 and assuming the door 12 is being closed, the closing of latch switch 60 caused by latch hook 54 produces rising edge 325a and the opening of switch 60 as door 12 reaches secondary latch produces falling edge 325b. With further closure, the closing of latch switch 60 caused by primary hook 55 produces rising edge 325c; and the opening of switch 60 as door 12 reaches primary latch produces falling edge 325d. Thus, a binary LATCH signal is provided to processor 205 to indicate, when door 12 is near its closed position, the movements of latch apparatus 36 which activate switch 60, from which the latch status may be interpreted. This status may be a region before secondary latch represented by the high voltage level between the edges 325a and 325b, secondary latch represented by the low voltage level between the edges 325b and 325c, a region before primary latch represented by the high voltage level between the edges 325c and 325d, or primary latch represented by the low voltage level subsequent to the edge 325d.

In order to determine when the plunger contacts 301a–301e are in contact with stationary contacts 300a–300e, the PLUNGER input to processor 205 is generated by the following circuitry. Normally closed contact 297 of relay 294 in FIG. 6 is connected through line 315 (continued in FIG. 5), resistor 316 (100K) and inverting buffer 317 to the PLUNGER input of processor 205. A resistor 318 (180K) and capacitor 319 (0.01 uF) are connected in parallel to ground from the input of inverting buffer 317; and a capacitor 320 (220 pF) is connected from line 315 to ground.

In operation, as door 12 is closing, clutch apparatus 114 is activated by relay 282; and line 315 is thus connected to voltage B+ through resistor 298 and armature 281 and normally open contact 284 of relay 282. Before plunger contacts 301a and 301b contact stationary contacts 300a and 300b, a high voltage is provided on line 315. When these plunger contacts and stationary contacts engage, however, line 315 is connected to ground through normally closed contact 297 and armature 299 of relay 294, contacts 300a and 301a, unlatch motor 302, and contacts 301b and 300b. The 470 ohm resistance of resistor 298 is much greater than the internal armature resistance of unlatch motor 302; and this resistance allows the voltage on line 315 to fall near ground while it prevents unlatch motor 302 from being activated by relay 282. Thus the PLUNGER signal changes to indicate plunger contact. Although stationary contact 300a could be connected directly to resistor 298, the connection through relay 294 as shown is preferred, since, when unlatch motor 302 is activated during door opening, the PLUNGER line is disconnected from the unlatch circuit to avoid conducting noise from unlatch motor 302 to processor 205.

FIG. 8 shows power supply apparatus for generating the various voltages used in the apparatus of FIGS. 5 and 6. A standard vehicle electrical power system, including alternator, voltage regulator, etc., is represented by battery 330 having a grounded terminal and a hot terminal. The hot terminal of battery 330 is connected by a significantly long, heavy gage wire 331 to a terminal B+, to which all parts of the circuits in this description labeled B+ are connected. This terminal is used to supply the heavy power needs of motors, the clutch coil, etc. Voltage B+ is the standard vehicle voltage—nominally 12 volts—dropped slightly when heavy currents are flowing through wire 331. A similarly long but lighter gage wire 332 connects the hot terminal of battery 330 to a terminal labeled BAT. The voltage on terminal BAT is also derived directly from the standard vehicle supply voltage of battery 330 but is not as much affected by the motor and clutch actuating currents through wire 331. A diode connects terminal BAT to a terminal +12, which provides the same voltage as BAT but with reverse voltage protection. This voltage is used to prevent damage to the electronic components if battery 330 is connected backward to the system. Finally, the +12 terminal is connected through a standard solid state voltage regulator circuit 334 to a terminal labeled +5, from which a regulated 5 volts is obtained for solid state electronic circuit components such as inverting buffers.

The operation of the digital processor 205 for controlling movement of the door 12 in accord with this invention is illustrated in FIGS. 9–16. The digital processor 205 has stored therein the instructions necessary to implement the routines embodied in FIGS. 9–16. The instructions are executed in a step-by-step manner by the digital processor 205 in accord with general practice in software execution.

Referring now to FIG. 9, a Timer routine executed by the digital processor for timing various functions and for keeping track of the position of the door 12 is illustrated. This routine is repeatedly executed at a constant time interval such as 250 microseconds. The routine is entered at point 350 and then determines at step 352 if the motor control is in a PWM mode (verses a continuous mode) where the drive motor 108 is being variably controlled by pulsewidth modulation of the applied voltage through the FET 250. As will be described, the motor 108 is energized by a pulsewidth modulated voltage signal at a controlled duty cycle for controlling the speed of the door 12 when the door is being powered closed by the motor 108. Assuming a PWM operating mode, the routine then proceeds to control the FET 250 to establish the desired duty cycle. The desired duty cycle is established by controlling the on and off times of the FET for each period of the PWM signal. The timing for the FET 250 on and off times to establish the desired PWM duty cycle begins at step 354 where the routine determines whether the FET 250 is currently on or off. If ON the routine determines at step 356 if the FET 250 has been on the required period based on a FET timer count value. If the timer count value indicates the FET has been on the required time, it is turned off and the FET timer cleared at step 358. Returning to step 354, if the FET 250 is off, a step 360 determines if the FET has been off for the required time. Assuming the FET has been off the required duration, the FET is turned on and the FET timer cleared at step 362. If either step 356 or 360 determines that the duration of the on or off state of the FET has not achieved the desired value dictated by the desired duty cycle, the FET timer timing the on and off duration of the duty cycle signal is incremented at step 364.

The remainder of the Timer routine relates to monitoring the door movement based upon the output of the position sensor 124. In the preferred embodiment, this portion of the routine is only executed every other interrupt interval of the Timer routine. If this condition is not satisfied as determined at step 366, the program exits the routine. Otherwise, the program reads the state of the SENSOR1 signal output of the sensor 124 at step 368. Step 370 then determines if the state of the SENSOR1 signal has changed since the last time the SENSOR1 signal state was last sampled. Assuming the SENSOR1 signal has not changed states, a pulse time count is incremented at step 372 for measuring the period PTIM of the SENSOR1 signal and therefore the rotational speed of the slotted disk 122. The period PTIM of the SENSOR1 signal is representative of the speed of movement of the door 12 and each SENSOR1 signal generated represents a predetermined distance of door movement.

Returning to step 370, if the state of the SENSOR1 signal has changed since last read, the direction of rotation of the sensor and therefore direction of movement of the door 12 is determined. This is accomplished via steps 374–378 which determines the direction of movement of the door on any edge of the SENSOR1 signal. A door closing condition is indicated and door closing flags are set at step 380 if the SENSOR1 signal is a logic 1 state and the SENSOR2 signal is a logic 0 state or if the SENSOR1 signal is a logic 0 state while the SENSOR3 signal is a logic 1 state. Similarly, a door opening condition is indicated and door opening flags set at step 382 if the SENSOR1 signal is a logic 1 state and the SENSOR2 signal is a logic 1 state or if the SENSOR1 signal is a logic 0 state and the SENSOR3 signal is a logic 0 state. Based upon the determined opening or closing of the door represented by the flag set at either step 380 or 382, a count value DOORP representing the position of the door 12 between its opened and closed position referenced to a door closed position is decremented or incremented at the respective step 384 or 386.

At step 388, a count value CNT2 is incremented which represents the amount of door movement since the power movement of the door was last initiated. In this respect, the count value CNT2 is reset upon the initiation of any power movement of the door. Step 390 then sets a door moving flag to indicate the door is moving. Since this flag is based upon a change in the state of the signal SENSOR1, it is set either when the door is being power moved by operation of the motor 108 or by manual movement of the door which backdrives the rotor of the position sensor 124 which generates the sensor pulses previously described.

Steps 392 and 394 along with step 372 provide for the determination of the period of the SENSOR1 signal representing the speed of the door 12. This process begins at step 392 which determines if the SENSOR1 signal is a logic 1. If not, the pulse time count PTIM is incremented at step 372. However, when the sensor signal first becomes a logic 1, the pulse time count is saved and the pulse time count PTIM is reset to begin timing the next period of the SENSOR1 signal. Thereafter and until the SENSOR1 signal again becomes a LOGIC1, step 372 functions to increment the pulse time count to time the period of the SENSOR1 signal. The pulse time PTIM saved at step 394 is a direct measurement of door speed and has a value inversely proportional thereto. Following step 372 or step 394, the program exits the Timer routine.

Figure 10:
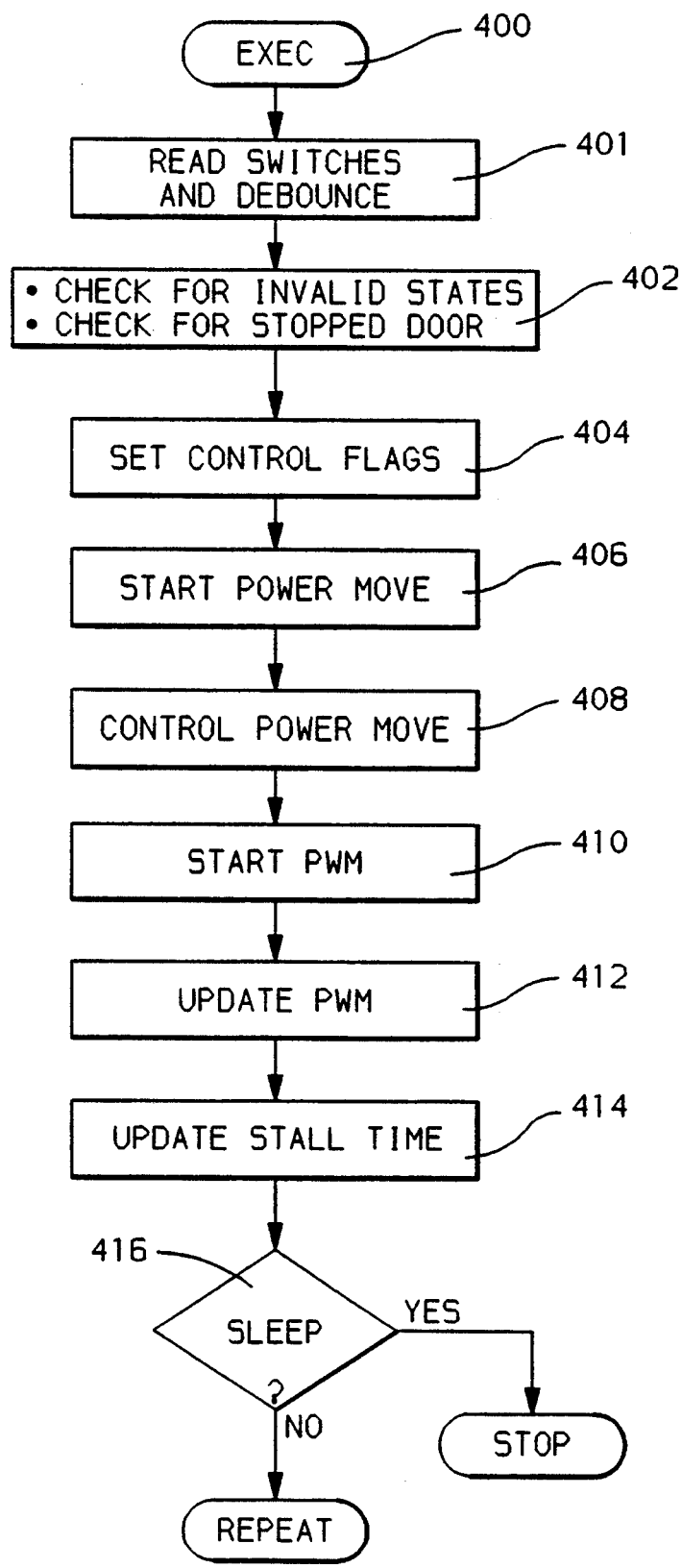

A main executive routine for controlling the operation of the door 12 is illustrated in FIG. 10. This routine is continually repeated until a sleep condition is indicated.

The main executive routine is entered at step 398 and then executes a routine 400 for reading and debouncing the state of the various bi-level input signals illustrated in FIG. 5. These signals include INHIBIT, PARK, IGN, PLUNGER, TOGGLE, REMOTE, IRQ, and LATCH. This routine also provides for debouncing the signals by requiring a predetermined period with an absence of a state change in order to be considered a valid state. The state of these debounced signals are then stored in random access memory.

Next, a diagnostic routine 402 is executed to determine the validity of the states of the various signals read and stored at step 400. Further, step 402 determines whether or not the door 12 is in a stopped condition. This may be based, for example, on a predetermined high value of the SENSOR1 signal period PTIM. If this condition is sensed, the door moving flag is cleared to indicate a stopped condition of the door and the position DOORP of the door determined by the timer routine of FIG. 9 is stored to store the stopped door position.

The main executive routine next executes a Set Control Flags routine 404 which establishes the initial parameters for door opening or door closing and which further determines the status of the latching mechanism of FIG. 4 as the door is closed. This routine will be described in detail in reference to FIG. 11.

A Start Power Move routine 406 is then executed to initiate power movement of the door 12 in response to an operator initiated input via the toggle switch 211 or the receiver 212 or in response to manual movement of the door. This routine will be described in detail in reference to FIG. 12.

A Power Control Move routine 408 is then executed to control the power movement of the door 12 initiated by the start power move routine 406. In general, this routine provides for power control of the door including control in response to a TOGGLE signal state change, the REMOTE signal from the receiver 212, the door encountering an obstruction, the door reaching a full open or closed position and a manual movement of the door. This routine will be described in detail in reference to FIG. 13.

The main executive next executes a Start PWM routine 410 which determines if conditions are present for controlling the speed of the door via pulsewidth modulation of the motor 108 voltage. In general, when the door speed becomes excessive or when the door reaches a predetermined position, pulsewidth modulation of the energization of the motor 108 at a controlled duty cycle is initiated by the routine 410 for speed control. This routine is illustrated in detail in FIG. 14.

An Update PWM routine 412 is next executed which establishes the duty cycle of the pulsewidth modulated signal initiated by the start PWM routine 410. In general, this routine provides for control of the speed of the door 12 in various stages as will be described in detail in reference to FIG. 15.

Next, an Update Stall Time routine 414 is executed to determine a value of the period PTIM of the sensor signal SENSOR1 that represents a stall condition of the motor 108 in response to the door encountering an obstruction load resistance. This stall time is utilized in the Control Power Move routine 408 to determine whether or not to reverse or stop power movement of the door in response to an obstruction. The Update Stall Time routine 414 is illustrated in detail in FIG. 16.

Step 416 then determines whether or not the computer is to enter into a sleep mode where certain system functions are suspended to save power. For example, if the door is fully closed and there has been a lack of input switch activity for a predetermined period of time, step 416 inters into the sleep mode. The system may then be wakened in response to a sensed activity of input switches. The main executive is repeated if conditions for a sleep mode are not sensed.

Referring to FIG. 11, the Set Control Flags routine is illustrated for initiating the power opening or closing of the door 12 and for monitoring the condition of the latching mechanism of FIG. 4. This routine is entered at step 450 and proceeds to step 452 where it determines if there have been any changes in the state of the switch inputs read and stored at step 401. If there have been no changes, the program exits the routine. If there has been a switch change, the routine determines if the power operation of the door should be inhibited based upon the vehicle transmission gear. Power operation of the door is inhibited unless the vehicle transmission is in park. If the transmission is not in park, an inhibit door open flag is set at step 456. Other criteria for inhibiting powered door operation may be employed. For example, if there is an invalid ignition state indicating a disconnected wire or a blown fuse, the inhibit flag may be set at step 456 to inhibit power door operation.

Next the routine determines if a door close flag or a door open flag should be set to initiate power movement of the door 12. In general, if a step 458 determines that the TOGGLE signal has changed states indicating an operator initiated input for power door operation and the INHIBIT signal is not active indicating the manual switch 210 is not actuated to inhibit power door operation, the door open flag is set if the door is in a latch position or the door position is less than a calibration value DP1, which may be the position at which the door track curves inwardly as the door closes as viewed in FIG. 1, or if the door position is unknown. These conditions are sensed by steps 462–466, respectively. If none of those conditions exists, the door close flag is set at step 468 to provide for power door closing. Otherwise, the door open flag is set at step 470 to provide for power door opening.

If step 458 does not sense either a change in the TOGGLE signal or the REMOTE signal from the receiver 212 or if step 460 senses the INHIBIT signal is active, steps 468 and 470 controlling the state of the door close and door open flags are bypassed.

The routine next determines at step 472 if the door is closing and not in the primary latch position. If the door is unlatching, or opening or the latch is in primary latch, door open conditions are set at step 474. However, if the door is closing and not in primary latch the routine proceeds to execute a series of steps for monitoring the progression of the latch mechanism as the door is closed toward the primary latch position. The progression is monitored by monitoring the LATCH signal controlled by the state of the latch switch 60. The LATCH signal is illustrated in FIG. 7 as the door is closed to primary latch position. The routine determines when the door enters the before secondary latch region represented by the edge 325a, enters the secondary latch region represented by the trailing edge 325b, enters the before primary latch region represented by the leading edge 325c and enters the primary latch represented by the trailing edge 325d.

First the routine determines at step 476 if the door has entered the before secondary latch region represented by the state of a before secondary flag. If this flag is not set indicating the door has not reached the before secondary latch region, the routine proceeds to step 478 to determines if the LATCH signal is high. If not, the program exits the routine. If however, the LATCH signal is high indicating the leading edge 325a has just occurred, the before secondary region flag is set at step 480 to indicate the door has reached the before secondary latch region. Thereafter the program exits the routine. Once the before secondary latch region flag is set, the routine then senses when the door has reached the secondary latch position via steps 482–486. Step 482 determines if the secondary latch flag is set indicating the door has already reached the secondary latch region. Assuming it has not, step 484 determines if the LATCH signal has been low for a predetermined number of door position counts, such as 2 thereby assuring validity of the LATCH signal state, indicating entry into the secondary latch region. If not, the program exits the routine. When it is determined that the LATCH signal has been low for 2 door position counts indicating the occurrence of the trailing edge 325b of FIG. 7 has occurred, the secondary latch flag is set at step 486 to indicate the door is in secondary latch position. Thereafter, the program exits the routine. When the secondary latch flag has been set, the program then senses when the door has reached the before primary latch region via steps 488–492. Step 488 determines if the before primary flag is set indicating the door has already reached the before primary latch region. If not, the routine determines at step 470 if the LATCH signal has gone from a low state to a high state indicating the door has reached the before primary latch region. If not, the program exits the routine. However, when step 490 first detects a high state of the LATCH signal has gone high represented by the leading edge 325c of FIG. 7, the before primary flag is set at step 492 to indicate the door has reached the before primary latch region. Thereafter, the routine senses when the door has attained primary latch via steps 494 and 496. Step 494 determines if the LATCH signal has been low for at least one door position count thereby assuring validity of the LATCH signal state. If not, the program exits the routine. However, when the LATCH signal has been low for a period of one door position count indicating the occurrence of the trailing edge 325d of FIG. 7, the primary latch flag is set at step 496 to indicate the door has reached primary latch. Thereafter, the program exits the routine. In the foregoing manner, steps 476–496 monitor the progression of the door as it is closing to progressively indicate the sequential latch conditions until such time the door has entered into primary latch.

Next the routine executes the Start Power Move routine to initiate power movement of the door 12. In general, power door movement is initiated in response to the door close flag or the door open flag being set in FIG. 11 or in response to a sensed manual movement of the door at which time power movement is initiated in the direction of manual movement.

The Start Power Move routine is entered at step 500 and then proceeds to determine if power movement of the door is enabled. A disabled condition is represented by (A) the INHIBIT signal in response to actuation of the on-off switch 210 to the off position, (B) in response to a diagnostic routine indicating a fault condition, or (C) if power movement of the door has already been initiated. If power move is disabled, the program exits the routine. However, if power movement of the door is enabled, the routine then determines if power movement should be initiated and if so, proceeds to initiate the power movement of the door.

It will first be assumed that the door is closed in the primary latch position and power movement has not yet been initiated. Assuming these conditions and beginning at step 504, the routine determines if an unlatching flag has been set. Being initially reset, a step 506 determines if the door is moving. This condition is represented by the door moving flag controlled in the Timer routine at step 390. Assuming initially that the door 12 is not moving, the routine proceeds to a step 508 where the state of the door close flag is sampled. This flag was previously described in respect to FIG. 11 and is set when the conditions are sensed for initiating a power closing of the door. Since the door was assumed closed so that this flag is not set, the routine proceeds to step 510 to determine if the door open flag is set. Again, this flag is controlled via the routine of FIG. 11 and is set when the conditions are indicated for initiating a power opening of the door 12. If this flag is reset, the program exits the routine and power movement is not initiated.

Assuming now the operator activates the toggle switch 211 or operates the receiver 212 to initiate power movement of the door 12, the resulting set condition of the door open flag is sensed at step 510. Step 512 then determines if power opening of the door is to be inhibited. An inhibited condition may be indicated, for example, in response to a diagnostic fault condition or the transmission being out of a park position. If inhibited, the door position DOORP determined in the Timer routine of FIG. 9 is stored in a stop position memory location in the processor 205. Thereafter the program exits the routine. However, if power opening is not inhibited, a step 516 sets the unlatching flag and clears the door open flag that initiated power movement of the door.

The routine then initiates unlatching of the door, waits for a time period to allow the unlatch motor 302 to complete the unlatch function and initiates power movement of the door. This begins at step 518 where a delay timer is set to a delay period representing the time allowed for the unlatch motor 302 to unlatch the door. The UNLATCH signal is then set to an active state at step 520 to energize the unlatch motor 302 which rotates the detent 52 to release the striker 37 to unlatch the door 12. Thereafter and directly from step 504 during subsequent executions of the Start Power Move routine, a step 522 determines if power door opening of is to be inhibited based on the same criteria utilized at step 512.

If power door opening is inhibited, the stop position is stored in memory at step 524 as previously described in relation to step 514.

Returning to step 522 and assuming power door opening is not inhibited, step 526 determines if the time delay initialized at step 518 has expired. If not, the program exits the routine. However, when the time delay has expired indicating adequate time for the unlatch function to be completed, step 528 determines if the door is in the latch area. This is represented by the active state of the PLUNGER signal resulting from engagement of the contacts 300a and 301a. If the PLUNGER signal is not active or a step 530 indicates the latch switch 60 is closed (LATCH signal active) indicating the detent 52 has been rotated to release the fork bolt 42, power opening is initiated beginning at step 532 by energizing the open relay 256 of FIG. 6 to energize the motor 108 for opening the door 12. Step 532 also sets a power open flag and clears the unlatch flag previously set at step 516.

So that the value of DOORP controlled in the Timer routine of FIG. 9 indicates the absolute position of the door relative to the closed position, the routine provides for clearing DOORP prior to the first power opening of the door. This function is accomplished beginning at step 534 where an opened once flag is sampled to determine whether or not DOORP has already been initialized. If the flag is in a cleared state, a step 536 sets the opened once flag after which the door position count DOORP is cleared at step 538 to provide correspondence between DOORP and actual door position. Steps 536 and 538 are bypassed via step 534 during subsequent executions of the routine.

The routine then continues to initiate power door opening. A step 540 sets the CLUTCH signal high to energize the clutch 114 which engages the motor 108 drive to power the door open by rotating the pulley 96. Thereafter at step 542, the count CNT2 incremented at step 388 in the timer routine of FIG. 9 is reset and the door moving flag is set. The clearing of the count CNT2 provides for monitoring the distance the door 12 is moved during the power move. At the next step 544, the door open and close flags controlled via the Set Control Flags routine of FIG. 11 are cleared. Initiation of power door opening is now complete and the program exits the routine. Once power door opening has been initiated, the Start Power Move routine is then bypassed via step 502.

Returning to step 530, if the unlatch time has expired during which unlatching should occur step (526), the door is still in the latch area (step 528) and the latch switch is not closed indicating the detent 48 has not been moved by the unlatching motor 302, a no-latch switch flag is set at step 546 after which the stop position of the door is stored at step 548.

Now assuming the condition wherein the door 12 is stopped and the Set Control Flags routine of FIG. 11 sets the door close flag at step 468, the Start Power Move routine proceeds as previously described via steps 502–506 to step 508 where the set state of the door close flag is sensed. When sensed, the routine proceeds to initiate power closing of the door 12 beginning at step 550 where the CLOSE signal is set high to energize the close relay 262 of FIG. 6 and the FET 250 is turned on to energize the motor 108 in direction for closing the door 12. Additionally, a door closing flag is set. Thereafter, the clutch 114 is energized at step 540 as previously described to engage the motor drive to begin driving the door in the closing direction. Step 542 and 544 are then executed as previously described. Initiation of power door closing is now complete and the program exits the routine. Thereafter the Start Power Move Routine is bypassed via step 502.

The foregoing describes the initiation of power movement in response to the actuation of the toggle switch 211 or upon a remote command to the receiver 212. However, power movement of the door is also initiated in response to manual movement of the door. When manual movement is sensed, the routine initiates power movement of the door 12 in the direction of the manual movement to complete opening or closing the door under control of the digital processor 205.

The manual to power move is provided by the Start Power Move routine of FIG. 12 which senses a door movement while the door is otherwise not being power moved by operation of the motor 108 and initiates power movement in the direction of the detected movement to complete the manually initiated door movement. In the preferred form to be described, the manual to power movement is initiated only when the door is manually moved a predetermined distance. This allows some movement of the door, such as resulting from a vehicle passenger entering or exiting the vehicle that uses the door for assist, without initiating power movement. Because the door movement is based on the SENSOR1 single from the sensor 124, the number of SENSOR1 signals representing the predetermined distance before power movement is initiated is greater when the cable 72 is being wound on the small diameter of the pulleys 84 and 86 versus the number of counts when the cable 72 is being wound on the large diameter portion.

Manual movement of the door is sensed by the Start Power Move routine via steps 502–506. Recalling that one of the conditions of step 502 enabling start of power movement is that the door is not already being power moved, a door movement represented by the door moving flag (set by step 390, FIG. 9) sensed via step 506 represents a manual movement of the door. When this condition is sensed, the routine proceeds to step 552 to determine if the door is in the latch area represented by the high state of the PLUNGER signal when the door 12 is close to a position wherein contacts 300a and 301a are engaged. If this condition exists, power movement of the door is not initiated in response to a sensed movement of the door and the program exits the routine. However, if the door 12 is not in the latch area, the routine determines at step 554 if the door has moved the required number K1 of door position counts from the last stopped door position representing the required distance of door movement when the cable 72 is being wound on the large diameter of the pulleys 84 and 96 to initiate power movement. If the door has not been moved this distance, the program exits the routine and power movement of the door is not initiated. However, if the door has been moved the number of position counts K1, a step 556 determines if the cable 72 is being wound on the small diameter portion of the reels 84 and 96 as represented by a door position DOORP less than position DP1. If the door position is equal to or greater than DP1, the door has moved the required number of counts to initiate power door operation. If the door position is less than DP1 indicating the cable is being wound on the small diameter of the reels 84 and 96, the routine determines via step 557 if the door has moved the required number K2 of door position counts from the last door stopped position representing the required distance of door movement. In one embodiment K1 may be 25 SENSOR1 signals and K2 may be 64 SENSOR1 signals. If step 557 determines the door has not moved the required number of counts, the program exits the routine and power movement of the door is not initiated. However, if the door has moved the required number of counts K2, the door has moved the required number of counts to initiate power movement of the door. If steps 554–557 determine the door has been manually moved the required distance to initiate power movement of the door, a step 558 then determines the direction of door movement. If the door is being manually opened, the routine initiates power opening of the door via steps 512–548 as previously described. If the door is being manually closed, a step 560 determines if the door position is less than DP1. In this embodiment, power movement of the door is not initiated if the door is being manually closed while the door position is already substantially closed. Accordingly, if the door position is less than DP1, the program exits the routine and power movement of the door is not initiated. However, if the door position is greater than DP1, the routine proceeds to initiate power door closing via steps 550, 540–544 as previously described.

Once a power door movement has been initiated by the Start Power Move routine of FIG. 12, the power move is then controlled by the Control Power Move routine of FIG. 13. In general, this routine continues the initiated power movement until one of three things happen: (1) the operator actuates the toggle switch 211 or a remote signal is received by the receiver 212, (2) the door reaches a fully open or closed position or (3) an obstructive load on the door is sensed. In response to these events, the routine provides for reversing the direction of the door movement or terminating the power move.

The Control Power Move routine is entered at step 600 and proceeds to sample the state of the power close flag at step 602. If this flag was not set via step 532 of the Start Power Move routine, the state of the power open flag is sampled at step 604. If this flag was not previously set at step 550 of the Start Power Move routine, the program exits the Power Control Move routine since power movement has not been initiated.

Assuming now that the Start Power Move routine of FIG. 12 initiated power opening of the door 12, the resultant set state of the power open flag is sensed at step 604 directing the routine to control the power movement of the door in the power opening direction. Accordingly the program then proceeds to step 606 to determine if the routine had previously set a switch reversal flag in response to the actuation of the toggle switch 211. Assuming initially that the switch reversal flag has not been set, the program proceeds to compare the time period PTIM representing the period of the position SENSOR1 signal with a stall time indicating the door encountering an obstruction. This stall time is controlled via the Update Stall Time routine of FIG. 16 to be described. In general, the door movement is either stopped or reversed in response to the period of the position signal SENSOR1 exceeding the stall time value. Assuming first that step 608 determines that PTIM has not exceeded the stall time indicating the door has not encountered an obstruction, the program proceeds to a step 610 to determine if the door position DOORP is greater than a previously determined full open position. Assuming the door has not been power moved to a position greater than this full open position, a step 612 determines if the toggle switch 211 has been actuated by the vehicle operator. If not, the program exits the Control Power Move routine and the powered door movement continues unaltered. As long as the position pulse period PTIM does not exceed the stall time, the door position does not exceed the full open position or the operator has not actuated the toggle switch 211, the foregoing steps are repeated so that power opening of the door 12 initiated by the start power move routine of FIG. 12 continues.

Returning to step 610, it will now be assumed that the door position DOORP exceeds a count value representing a full open door position. When this condition is sensed, power movement of the door 12 is terminated. This is accomplished beginning at step 614 where the open relay 256 is disabled to de-energize the motor 108. At step 616, the UNLATCH signal controlling the unlatch motor 302 when the door is closed to engage the plungers is reset. Thereafter, at step 618 the door open and close flags controlled by the Set Control Flags routine of FIG. 11 are cleared. Step 620 then samples the state of the switch reversal flag. As previously indicated, this flag is set in response to the actuation of the toggle switch 211. Assuming that the toggle switch was not actuated and the switch reversal flag is cleared, the power close flag is sampled at step 622 to determine whether a power close flag has been set to reverse direction of the door 12. Assuming the power close flag has not been set, the power open flag is reset at step 624 and the door position DOORP is stored as the stop door position at step 626.

If the door is being powered open for the first time since the vehicle was put in service, a step 628 saves the door position DOORP as the full open position. Thereafter, this step is bypassed and the routine proceeds directly to step 630 where the termination of power movement of the door is completed by de-energizing the clutch 114 by setting the CLUTCH signal low.

It will now be assumed that the vehicle operator actuates the toggle switch 211 while the door is being powered in an opening direction. In general, actuation of the toggle switch 211 functions to reverse direction of the door after expiration of a predetermined reverse delay time. In the preferred embodiment, reversal of the door is inhibited, however, if the door position is greater than one-half open. If this condition exist, power opening of the door is continued and the system does not respond to the actuation of the toggle switch. This condition is sensed at step 632, after operation of the toggle switch is sensed at step 612, where the routine compares the door position DOORP with a value representing one-half open position. If the door position is greater than this value, the program exits the routine and power opening of the door is continued. However, if the door position is less than one-half open or in another embodiment any time the toggle switch is actuated while the door is being powered open, the program executes a step 634 where a reverse delay timer is set to a predetermined calibrated value. Further, the switch reversal flag is set indicating the actuation of the toggle switch.

During the delay period represented by the reverse delay timer, the power opening of the door 12 is terminated and power closing initiated only upon expiration of the time delay. Essentially, the door simply "coasts" during the delay period. The termination of the power opening is accomplished via steps 614–618 previously described wherein the open relay 256 is de-energized to de-energize of the drive motor 108. Since the reversal flag was set at step 634, the routine proceeds from step 620 to a step 636 which determines if the reverse delay has expired. Since this delay was just set, the program directly exits the routine. Thereafter, the routine proceeds directly from step 606 in response to the set condition of the switch reversal flag to the step 636 to determine whether or not the reverse delay has expired. These steps are repeatedly executed with each execution of the Control Power Move routine until such time that the reverse delay has expired. When step 636 determines the reverse delay has expired, the routine proceeds to complete the power reversal by initiating power closing of the door 12. This begins at step 638 where the power close flag is set, the power open flag is cleared, the switch reversal flag is cleared and various door movement conditions are reset. These conditions include resetting the count CNT2 incremented at step 388 of the timer routine of FIG. 9 and which represents the powered movement of the door and the stall time is set to a calibrated value. This stall time will be modified as will be described in the Update Stall Time routine of FIG. 16.

Next at step 640, the close relay 262 is energized, the clutch 114 is energized and the field effect transistor 250 is turned on to energize the motor 108 to power the door in a closing direction. Thereafter, the program exits the routine via step 622 in response to the power close flag set at step 638, the switch reversal flag sampled at step 620 having also been cleared at step 638. During subsequent executions of the Control Power Move routine of FIG. 13, power movement in the closing direction is controlled as will be described.

Returning now to step 608, it will be assumed that as the door is being powered open, the door encounters a resistance such that the period of the position pulses SENSOR1 suddenly increases to a time exceeding the stall time indicating the door has encountered an obstruction. In response to this condition, the routine takes one of two actions. The first action is to reverse the direction of powered movement of the door to move the door away from the obstruction. The other action is to terminate power movement of the door 12. In the preferred embodiment, powered movement of the door is reversed and the door is powered closed if (1) the door is more than one-half way open, (2) the door is not further open than the rear detent which functions to hold the door open when the door is unpowered, and (3) the door has not already reversed once in response to the door encountering an obstruction. These conditions are sensed by step 642. If all of these conditions exist, the routine proceeds to a step 644 where a door reverse once flag is set to indicate that power movement of the door has been reversed once in response to a sensed stall condition. Thereafter, steps 638, 640, and 614–618 are executed to initiate powered closing of the door. The program exits the routine via step 622 as previously described.

Returning to step 642, if any one of the foregoing conditions exists for inhibiting power reversal of the door, the steps 638 and 640 providing for power closing of the door 12 are bypassed. Accordingly, the power closing flag is not set and the switch reversal flag is not cleared via step 638 so that steps 614–618 and steps 624–630 are executed as previously described to terminate powered movement of the door 12.

Returning to step 602, when the power close flag is in a set condition, the routine proceeds to control the power movement of the door 12 in the closing direction. This flag may have been set in the Start Power Move routine of FIG. 12 or in response to a reversal of direction of the door under control of the Control Power Move routine of this figure.

The control of the power movement in the closing direction begins at a step 646 where the state of the switch reversal flag is sampled. As previously described in relation to the control of the power movement in the open direction, this flag will be set in response to the actuation of the toggle switch by the operator for reversing the door direction. In this embodiment, while the door is being powered close, the routine will respond to the actuation of the toggle switch 211 to reverse the power direction of the door only if the door has attained secondary latch position represented by the set state of the secondary latch flag controlled by the Set Control Flags routine of FIG. 11 or if a stall condition is sensed as represented by the period PTIM of the SENSOR1 signal exceeding the stall time. These conditions are sensed by steps 648 and 650, respectively. If step 648 indicates the door has attained secondary latch position or if step 650 indicates that the period of the sensor signal SENSOR1 does not represent a stall condition, the state of the toggle switch is sampled at step 652. Assuming the operator has not actuated the toggle switch 211, the routine determines if the door has been completely powered closed represented by a set condition of the primary latch flag controlled by the Set Control Flags routine of FIG. 11. If the door has not been fully powered closed, the program exits the routine.

The foregoing steps 646–654 are continually repeated assuming the conditions do not change until such time that the door has been powered to a fully closed position and the primary latch flag is set indicating the fully closed position. When this condition is sensed, the program proceeds to terminate power movement of the door. This begins at step 656 where the close relay 262 is de-energized and the door open and close flags controlled in the Set Control Flags routine of FIG. 11 are cleared. A step 658 then samples the state of the switch reversal flag. This flag is in a reset condition so that the program then samples the state of the power open flag at step 660. Again, this flag is in a reset condition so that the routine proceeds to de-energize the clutch 114 at step 662, store the count value of DOORP as the stopped position of the door at step 664 and at step 666 turns off the field effect transistor 250 and clears the power closed flag. Thereafter, the program exits the routine. The foregoing steps provide for the normal procedure wherein the door is powered closed until it obtains a fully latched position wherein the power movement of the door is terminated.

Assuming now the condition wherein the vehicle operator actuates the toggle switch 211 while the door is being powered closed, the actuated condition of the switch is sensed at step 652. The routine then proceeds to a step 668 where the reverse delayed timer is set to a predetermined time delay and the switch reversal flag is set. The delay timer provides for a delay in the reversal of the door in the same manner as set forth in regard to the control of the power opening movement previously described. During this time period, power closing of the door is terminated. This is provided by the step 656 which de-energizes the close relay 262 to remove power from the drive motor 108. Step 658 then senses the set state of the reversal flag (having been set at step 668) after which a step 670 determines whether or not the reverse delay timer has expired. If not, the program exits the routine. Thereafter, step 670 is executed directly from step 646 in response to the sensed set state of the switch reversal flag.

Until such time that the reversal delay timer has expired, the routine repeatedly executes step 602, 646 and 670 after which the program exits the routine. When step 670 senses the expiration of the reverse delay, reversal of the power movement of the door is enabled and power opening of the door is initiated. This begins at a step 672 where the power open flag is set, the power close flag is reset and the switch reversal flag is cleared. Thereafter, the latch flags controlled by the Set Control Flags routine of FIG. 11 are cleared at step 674. A step 676 then turns off the field effect transistor 250, energizes the open relay 256 to energize the motor in direction for power opening the door 12, and energizes the clutch 114 to couple the motor output for driving the door. A step 678 then energizes the unlatch motor 302 to assure the door is fully unlatched to enable power opening. Thereafter the door movement conditions are reset as done as step 638 previously described.

During subsequent executions of the Control Power Move routine, the control of the power opening is provided as previously described in response to the set condition of the power open flag sensed by step 604.

Assuming now that while the door is being powered closed, an obstruction is encountered by the door thereby slowing the door speed such that the period of the sensor signal SENSOR1 suddenly increases to a value greater than the stall time. This condition is sensed at step 650 so that the routine proceeds then to a step 682 where the routine determines if the door has previously reversed as a result of a prior stall condition. As previously described in respect to the control of the power opening of the door, if the power movement of the door has previously been reversed in response to a stall condition, the occurrence of the second stall condition will result in the power movement of the door being terminated. However, if this is the first time that the door has reversed in response to a sensed stall condition, the power movement of the door is reversed and the door is then powered open. Assuming initially that step 682 determines that this is the first time that a stall condition has been encountered, the program proceeds to a step 684 where a door reverse once flag is set. Thereafter, the power movement of the door is reversed via the steps 672–680 and step 656. The routine proceeds directly from step 660 in response to the set condition of the power open flag (set at step 672) to provide for control of the power movement in the open direction previously described beginning at step 606.

Returning to step 682, if the routine senses the door has been reversed previously in response to a sensed stall condition, power movement of the door is terminated by proceeding directly to step 656 where the close relay 262 is de-energized to de-energize the motor 108. The switch reversal flag and the power open flag are both in reset conditions so that the routine proceeds from steps 658 and 660 to execute the steps 662–666 to complete the termination of power movement of the door as previously described.

When the door reaches a predetermined position while being power closed or if the door speed becomes excessive prior to the predetermined position, the processor 205 provides the PWM (pulsewidth modulated) control signal to the FET 250 of FIG. 6 at a controlled duty cycle for regulating the torque output of the motor 108 for regulating the closing speed of the door. Otherwise, the FET 250 is normally controlled continuously on in order to provide maximum motor torque output. The pulsewidth modulated signal at the desired controlled duty cycle is provided by the steps 352–364 of the timer routine of FIG. 9. The desired duty cycle is established by the Start PWM and Update PWM routines of FIGS. 14 and 15.

Figure 16:
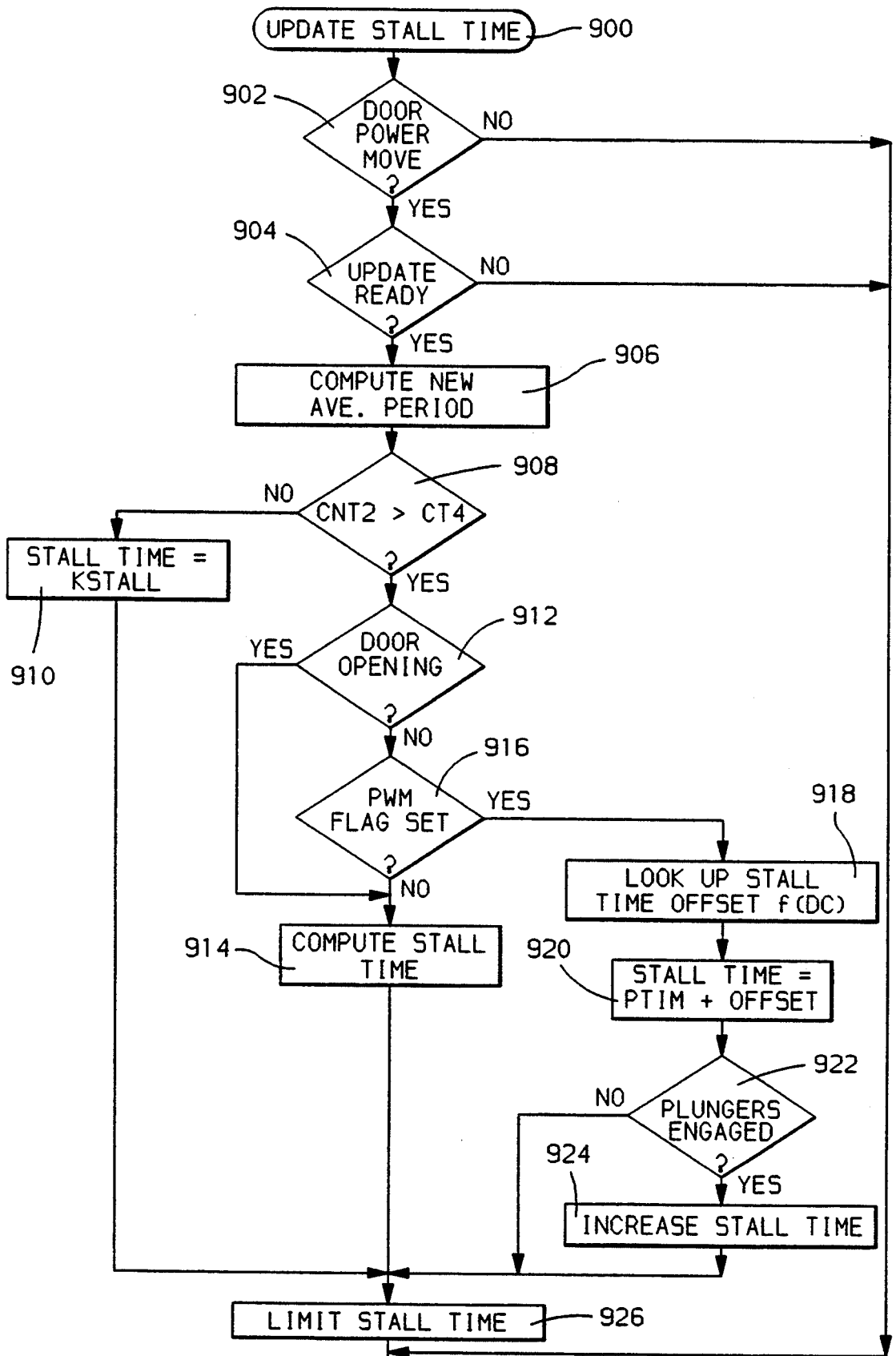

As will become apparent in reference to the Update Stall Time routine of FIG. 16, the pulsewidth modulation of the motor 108 at a controlled duty cycle to establish a constant door speed enables the determination of a stall time adapted to the torque output of the motor 108 so as to achieve desired reversal load characteristics when the door encounters an obstructive load.

The Start PWM routine of FIG. 14 is entered at point 700 and proceeds to a step 702 where the state of the power close flag is sampled. As previously indicated, pulsewidth modulation of the voltage applied to the motor 108 is only provided while the door is being powered closed. Accordingly, if this flag is not set, the program exits the Start PWM routine. However, if step 702 indicates the door is being powered closed, a step 704 senses the condition of the secondary latch flag controlled by the Set Control Flags routine of FIG. 11. If the door is in secondary latch indicated by a set condition of the secondary latch flag, the door is at a substantially closed position where a higher torque is required in order to fully close the door to the primary latch position. Further, at this position there is no space to accommodate an obstruction. Accordingly, a step 706 turns on the FET 250 continuously to provide maximum motor torque and a PWM flag is reset. This flag is sampled by the Timer routine of FIG. 9 at step 352 to bypass duty cycle modulation of the FET 250.

If the door has not yet reached the secondary latch position, the routine proceeds from step 704 to a step 707 where the state of PWM flag is sensed. If pulsewidth modulation of the motor already been initiated by the Start PWM routine, this flag will be set and the program exits the routine. Otherwise, the program proceeds to step 708 to determine if pulsewidth modulation of the motor voltage is to be initiated based upon the door attaining a predetermined position relative to the secondary latch position. If step 708 determines that the door position DOORP is within CT1 position counts of secondary latch position, the routine proceeds to (A) enable pulsewidth modulated control of the FET 250 for pulsewidth modulating the voltage applied to the motor 108 and (B) to establish the initial duty cycle of the pulsewidth modulated signal.

If step 708 determines that the door has not yet attained the position relative to secondary latch position for initiating pulsewidth modulated control of the motor 108, the routine proceeds to determine if pulsewidth modulated control should be initiated based upon door speed. This begins at step 710 which determines if the door position DOORP is within CT2 position counts of secondary latch position. CT2 is greater than CT1 so that pulsewidth modulation of the door may be enabled at an earlier point in time if the door speed becomes excessive. If the door position DOORP is not within CT2 position counts of secondary latch position, the program exits the routine. However, if within CT2 counts of secondary position, a step 712 determines whether or not the door is moving too fast based upon the period PTIM of the SENSOR1 signal. If this period is less than a predetermined calibration constant indicating the door moving too fast, the program proceeds to initiate duty cycle modulated control of the motor 108. If step 712 determines the door is not moving at an excessive speed, the program exits the routine and pulsewidth modulated control of the motor is not initiated.

If either of the conditions for initiating pulsewidth modulated control of the motor 108 exits, a duty cycle decrement door position DEC is set equal to the present door position DOORP at step 714. This door position is utilized in the Update PWM routine of FIG. 15 to be described. At the next step 716, the PWM flag is set to indicate PWM control and the FET timer utilized in the Timer routine of FIG. 9 at step 716 is initialized.

An initial duty cycle of the pulsewidth modulated signal is established based upon the door speed if the door has been power moved by a distance great enough to assure reliable determination of door speed. This begins at step 718 where the count CNT2 controlled by the Timer routine of FIG. 9 and which represents the distance of power door movement is compared to a calibration value CT3. If the distance the door has been moved is not greater than this amount, the door has not moved a distance to assure a reliable determination of door speed. Accordingly, a duty cycle value for the pulsewidth modulated signal is set at step 720 to a calibration constant DC1 which may be an intermediate duty cycle such as sixty percent. However, if the door has moved a distance greater than CT3, the initial duty cycle is determined based upon the door speed. This begins at step 722 where the door speed represented by the period PTIM of the SENSOR1 signal is compared with a calibration constant SPDHI representing a high speed threshold. If PTIM is less than SPDHI indicating the door speed is greater than the high speed threshold, the initial duty cycle of the pulsewidth modulated signal is set to a low value DCLO such as ten percent. However, if step 722 determines the door speed is not greater than the high speed threshold, the period PTIM of the SENSOR1 signal is compared with a calibration constant SPDLO representing a low speed threshold. If PTIM is greater than SPDLO indicating the door speed is less than the low speed threshold, the routine proceeds to a step 728 where the initial duty cycle value of the pulsewidth modulated signal is set to a high valued DCHI such as ninety percent. If step 726 determines that PTIM is not greater than SPDLO indicating the door speed is greater than the low speed threshold, the door speed is intermediate the high and low thresholds. In this case a step 730 initializes the duty cycle of the pulsewidth modulated signal at a value that is a predetermined function of the door speed. In general, the duty cycle value varies between DCLO and DCHI and is inversely proportional to the door speed between the high and low speed thresholds.

Once one of the steps 720, 724, 728, or 730 determines the initial duty cycle of the pulsewidth modulated signal, the routine proceeds to a step 732 where the present door position is stored as the last door position at which there has been a change in the duty cycle of the pulsewidth modulated signal. Thereafter at step 734, the initial duty cycle value is stored in a memory location representing the first duty cycle value utilized for door speed control. Next at step 736, the required on and off times of the PWM signal to achieve the initial duty cycle is retrieved from memory as a function of the determined duty cycle value. These times are then utilized by the timer routine of FIG. 9 for controlling the FET 250 on and off times to achieve the desired duty cycle value. Following step 736, the program exits the start PWM routine.

Once pulse width modulated control of the motor 108 is initiated, the Update PWM routine of FIG. 15 continuously adjusts the duty cycle value of the pulsewidth modulated signal to achieve the desired door speed characteristics. In general, the Update PWM routine determines if the door speed is within a desired speed range associated with a respective door position range. The duty cycle of the PWM signals applied to the FET 250 is adjusted in direction to control the door speed to within the desired speed range only when the door position has changed a predetermined amount while the door speed has been continuously outside of the desired speed band since the last adjustment of the duty cycle in that direction. The predetermined amount of door position change while the door speed is continuously outside of the desired speed band may vary depending upon which of the speed ranges is desired and further may depend upon whether the speed of the door is too fast or too slow relative to the desired speed range.

The Update PWM routine begins at point 800 and proceeds to a step 802 to determine if the PWM flag had been set by the Start PWM routine of FIG. 14 initiating PWM control. If not, the program exits the routine. The duty cycle of the pulsewidth modulated signal may be updated only if the door position has changed since the last update as sensed at step 804. If the door position has not changed, the program exits the routine. Otherwise, the routine determines if the duty cycle of the pulse width modulated signal should be adjusted for door speed control. In the following description various door speed values are represented by SENSOR1 signal period PTIM times T1, T2, T3, T4, T5, and T6. To illustrate the relationship between these times, the following values of those times represent one embodiment: T1=32 msec, T2=29 msec, T3=48 msec, T4=45 msec, T5=56 msec, and T6=53 msec.

At step 806 the door position DOORP is compared with the position CT1 above which pulse width modulated control of the motor 108 is enabled only if the door speed was too fast. If the door position is equal to or greater than this position, a desired speed range for the door is represented by a period PTIM of the SENSOR1 signal anywhere in the range between times T1 and T2 where T1 represents the lower speed boundary and T2 represents the upper speed boundary. The step 808 determines if the period of the SENSOR1 signal is greater than the lower speed boundary T1 indicating the door speed is too slow. If the door speed is too slow, the program proceeds to step 810 where a too slow flag is set. If the period PTIM of the sensor signal is equal to or less than the time T1, the speed of the door is not too slow.

Returning to step 806, if the door position DOORP is less than CT1, step 812 determines if the door position DOORP is greater than the door position RAMP at which the cable enters the ramp groove 162 and 160 of the pulleys 84 and 96. If the door position is between this ramp position RAMP and CT1, a desired speed range is represented by a period of the SENSOR1 signal anywhere in the range between times T3 and T4 where T3 represents the lower speed boundary and T4 represents the upper speed boundary. Accordingly, if DOORP is greater than RAMP, a step 814 compares the SENSOR1 signal period PTIM to the time T3 representing the low speed of the range. If PTIM is greater than T3, the door speed is too slow and the program proceeds to set the too slow flag at step 810. Otherwise, the door speed is not to slow.

Returning to step 812, if the door position DOORP is equal to or less than the position at which the cable begins to ramp down to the smaller diameter portion of the pulleys 84 and 96, the desired speed range for the door is bounded by a low speed represented by a SENSOR1 signal period PTIM equal to T5 and an upper speed represented by a SENSOR signal period PTIM equal to the time T4 if the door position DOORP represents the cable is not being wound on the small diameter portion of the pulleys 84 and 96 and the time T6 is DOORP is equal to or less than the position at which the cable begins to wind on the small diameter portion of the pulleys.

When the door position first enters into the range where the cable begins to ramp down to the smaller diameter of the pulleys as represented by step 812 first sensing the door position becoming equal to the ramp position, the duty cycle of the pulsewidth modulated signal is initialized to the lowest duty cycle that was established throughout the travel of the door up to that position so as to force the motor output to be the lowest previously established torque and to provide for a lower obstructive load to initiate power reversal. This is accomplished beginning at step 816 where the door position DOORP is compared to the position RAMP representing initial entry into the ramp portion of the pulleys 84 and 96. If the door position is equal to this value, the duty cycle is set at step 818 equal to the low duty cycle stored by the Update PWM routine as will be described. When the door position moves further closed, the step 818 is bypassed. Accordingly, this duty cycle is set only once as the door is powered closed and when the door attains the predetermined position RAMP.

A step 820 then sets a near closed flag after which the SENSOR1 signal period PTIM is compared at step 822 with the time T5 representing the low speed threshold of the desired speed range. If PTIM is greater than T5, the door speed is too slow and the program proceeds to set the too slow flag at step 810. Otherwise, the door speed is not too slow.

Assuming the routine has determined that the door speed is too slow and the too slow flag was set at step 810, the routine proceeds to step 824 where a duty cycle decrement door position DEC is set equal to the present door position DOORP. Thereafter, a difference position DIFFP is determined that is the difference between a duty cycle decrement door position Inc and the present door position DOORP. The door position INC is the last door position at which either the duty cycle of the PWM signal was incremented or at which the door speed was not to slow. Therefore the value of DIFFP determined at step 826 is the distance the door has moved while the door speed was continuously too slow since the PWM signal was last increased.

The program then proceeds to step 828 to determine whether or not the spring loaded plunger contacts 301a-301e have engaged the stationary contacts 300a-300e. If the plungers have engaged, a higher resistance to door movement is encountered and the program provides for a more aggressive adjustment of the duty cycle of the pulsewidth modulated signal in order to maintain door speed and to increase the motor torque required to continue movement of the door to the closed position.

Assuming first that the plunger signal output of the inverter 317 is active indicating the plungers have engaged, a step 830 compares the value DIFFP to a count such as 2. If DIFFP is not equal to 2 indicating that since the duty cycle was last incremented the door has not moved at least two position counts while the speed has been continuously too slow, the program exits the routine. However, if DIFFP is greater than or equal to 2 indicating the door has moved at least two position counts while its speed was continuously too slow since the duty cycle of the PWM signal was last incremented, the condition for incrementing the duty cycle to increase the motor torque has been met. Accordingly, a step 832 is first executed wherein the value of INC is reset to the present door position DOORP after which step 834 determines if the duty cycle has been incremented two levels above the lowest duty cycle established during the power close movement. This represents a limit of the adjustment of the duty cycle for increasing the motor torque to control door speed. If the duty cycle has been incremented two levels, the program exits the routine. However, if the duty cycle has not been incremented for the two levels, the duty cycle is incremented at step 836 to increase the motor torque to increase the door speed toward the desired speed range. In the preferred embodiment, the duty cycle is incremented in steps of five percent. Accordingly, by incrementing the duty cycle at step 836, the duty cycle is adjusted by five percent. Thereafter at step 838, the pulse timer on and off counts to establish the desired duty cycle are retrieved from memory as a function of the desired duty cycle. These times are utilized in the timer circuit for controlling the FET 250 at the desired duty cycle.

Returning to step 828, if the plunger signal is not active indicating the plungers have not engaged, a step 840 determines if the door position indicates the cable is being wound on the small diameter portion of the pulleys 84 and 96. When this condition exists, the preferred embodiment provides for making the system less responsive to increases in forces by requiring a greater distance of door movement while the speed is continuously too slow before the duty cycle is incremented. Accordingly, at step 842 the difference position DIFFP computed at step 826 is compared with a large door movement of 9 counts. If the door has not moved this distance while the speed is too continuously slow since the duty cycle was last incremented, the program exits the routine. However, if DIFFP is equal to or greater than 9, the condition is met for incrementing the duty cycle for increasing the motor torque and therefore door speed. Accordingly, the program proceeds to execute the steps 832-838 as previously described for incrementing the duty cycle of the pulsewidth modulated signal.

Returning to step 840, if the door position DOORP does not indicate the cable as being wound on the small diameter portion of the pulleys 84 and 96, the duty cycle of the pulsewidth modulated signal is incremented if the door movement DIFFP is equal to or greater than 5. Accordingly at step 844, the difference position DIFFP computed at step 826 is compared with a position change equal to five counts. If the position has not changed this amount, the program exits the routine. However, if DIFFP is equal to 5 indicating the door position has changed five counts while the door speed has been continuously too slow since the duty cycle was last incremented, the routine proceeds to execute the steps 832–838 previously described for incrementing the duty cycle of the pulsewidth modulated signal.

In the foregoing manner, as long as the door speed remains too slow, the routine provides for adjusting the duty cycle in order to increase the door speed toward the desired speed range. It can also be seen that the duty cycle is representative of the motor torque required to maintain the door at the desired speed.

If any one of the steps 808, 814 and 822 determine that the door speed is not too fast and therefore either within the range or too fast, the routine proceeds to a step 846 where the duty cycle increment door position INC is set equal to the current door position DOORP. Thereafter, the routine determines whether or not the door speed is too fast according to the speed range associated with the door position. This begins at step 848 where the door position DOORP is compared with the position CT1 representing the position threshold utilized at step 806. If the door position is equal to or greater than CT1, the routine compares at step 850 the period PTIM of the sensor signal with the time T2 representing the high speed threshold of the speed range. If the period PTIM is greater than T2, the speed is within the desired speed range and the program sets the duty cycle decrement position DEC equal to the current position DOORP at step 852 after which the program exits the routine. If however, the sensor signal period PTIM is not greater than T2, the door speed is faster than the high speed threshold and the program proceeds from step 850 to a step 854 where the difference position DIFFP is set equal to the difference between the duty cycle decrement door position DEC and the current door position DOORP. This value then represents the distance the door has moved while the speed was continuously too fast since the duty cycle was last decremented.

Returning to step 848, if the door position is less than CT1, the door position DOORP is compared at step 855 to a position representing the cable being wound on the small diameter of the pulleys 84 and 96. If the door position is greater than this position indicating the cable is on the ramp portion of the pulleys, 1 the sensor signal period PTIM is compared at step 856 with the time T4 representing the high speed threshold of the speed range. If PTIM is greater than T4, the speed is in the desired speed range and the program proceeds to set the duty cycle decrement door position DEC equal to DOORP at step 858 after which the program exits the routine. If the sensor signal period PTIM is not greater than T4, the speed is too fast and the program proceeds to compute the difference position DIFFP at step 854 as previously described.

Returning to step 855, if the door position DOORP indicates the cable is being wound on the small diameter portion of the pulleys, a step 860 determines if the sensor signal period PTIM is greater than the time T6 representing the high speed threshold of the speed range. If the sensor signal period PTIM is greater than T6, the speed is within the desired speed range and the routine proceeds to set the duty cycle decrement door position DEC equal to DOORP at step 858. However, if the period PTIM is not greater than T6, the value of DIFFP is computed at step 854 as previously described.

If any one of the steps 850, 856 and 860 determines the door speed is too fast, after step 854, a step 862 determines if the door speed has been reduced to any desired speed range since pulsewidth modulation was first initiated. In this respect, the system provides for aggressively decreasing the speed of the door if the door speed has not yet been reduced to within the desired speed range and further if the door has not slowed down by a certain predetermined amount within a predetermined door movement. Accordingly, if the door has not yet been controlled to within a desired speed range, a step 864 determines if the speed has decreased the predetermined amount over the specified amount of door movement. If not, the difference position DIFFP is compared with a predetermined low value such as 3. If the door position has not changed by more than 3 counts since the duty cycle was last decremented while the speed was continuously too fast, the program exits the routine. However, if the difference position DIFFP is greater than 3 indicating the door speed has been continuously too fast for a door movement of 3 counts since the duty cycle was last decremented, a step 868 sets the door decrement position DEC to the current position DOORP after which steps 870 and 878 are executed repeating the functions of steps 862 and 864. Since those conditions were previously indicated as not having been met, the routine proceeds then to step 880 where the duty cycle value is compared with the lowest possible duty cycle value DC0, such as ten percent. If the duty cycle has already been decremented to this value, the program exits the routine. Otherwise, a step 882 decrements the duty cycle to decrease the motor torque output to decrease the door speed and, if the resulting duty cycle value is lower than the previously stored lowest duty cycle value, stores the new duty cycle value as the new low duty cycle value. Thereafter, the duty cycle pulse ON/OFF times are retrieved from memory as a function of the desired duty cycle and utilized by the Timer routine of FIG. 9 to control the FET 250 at the desired duty cycle.

Returning to step 864, if the speed has decreased the predetermined amount within the specified distance of door movement, the routine determines if the difference position DIFFP is greater than 8. If not, the required condition for decrementing the duty cycle does not exist and the program exits the routine. However, if the door speed has been continuously too fast for over 8 position counts since the duty cycle was last decremented, the routine proceeds to step 868 where the door decrement position DEC is set equal to DOORP after which step 870 determines if the door speed has been within the desired speed range. Since this condition was not met (having initially been determined at step 862), step 878 determines the required speed decrease criteria has been met so that the routine then proceeds to a step 888 where the current duty cycle is compared with the second duty cycle level DC1. This duty cycle may represent, for example 15 percent. If the duty cycle is not greater than this value, further reduction in the duty cycle is inhibited and the program exits the routine. Otherwise, step 882 decrements the duty cycle to the next lower level and if lower than the lowest duty cycle stored, is stored as the new lowest value. Thereafter, the pulse ON/OFF times for establishing the desired duty cycle are obtained from a look-up table in memory and utilized by the Timer routine of FIG. 9 to establish the desired duty cycle value.

Returning to step 862, if the door speed has been within a desired range, the duty cycle of the pulsewidth modulated signal is decremented if the door position changes five counts since last decremented if the door speed has been continuously too fast. This condition is sensed at step 890. If DIFFP is not greater than five, the program exits the routine. However, if DIFFP is greater than five indicating the required door movement while the speed was continuously too high, the routine proceeds to execute the steps 868, 870, 888, 882 and 884 as previously described for controlling the duty cycle to establish the desired door speed.

In the foregoing manner, the door speed is close-loop controlled by adjustment of the duty cycle value of the pulsewidth modulated signal to control the motor torque.

As previously described in relation to the Control Power Move routine of FIG. 13, power movement of the door is reversed to reverse door movement or if previously reversed is terminated when the position sensor pulse time PTIM exceeds a stall time representing the door encountering an obstructive load. In order to keep the obstruction load required to initiate door reversal within predetermined limits while at the same time not reversing the power movement at an excessively low obstruction load resistance, the stall time utilized in the control Power Move routine of FIG. 13 is made a predetermined function of the duty cycle of the pulsewidth modulated signal of the voltage applied to the motor 108. Particularly, the stall time is made inversely proportional to the motor voltage duty cycle which is in turn a representation of the motor torque. In the preferred embodiment, for each duty cycle value established by the update PWM routine of FIG. 15, there is a corresponding stall time value used for detecting an obstruction load. In general, the stall time is reduced at higher duty cycle values such that when the motor is running under a high torque condition, the reversal load characteristics for detecting the obstruction load remain low.

The update stall time routine is entered at point 900 and proceeds to step 902 to determine if the door is being powered moved. If not being driven by the motor 108, the program exits the routine. If the door is being power moved, the stall time is updated only if a SENSOR1 position signal has occurred since the update stall time was last executed. If a step 904 determines a position pulse has not occurred, the program exits the routine. Otherwise, an average period of the position sensor signal SENSOR1 is computed at step 906. In this embodiment, the average period of the sensor signal is based upon the computation of seventy-five percent of the previous average of the sensor signal period PTIM plus the last determined period of PTIM.

The step 908 determines if the distance CNT2 of power door movement has exceeded a threshold CT4 since power move was initiated. If not, the stall time is set equal to a constant value such as one quarter second at step 910. If however the door has moved at least a distance greater than the count CT4, a step 912 determines if the door is opening or closing. If the door is opening, a stall time is computed at step 914 which is based on the average period computed at step 906. In one embodiment, the stall time is computed at this step as $\frac{3}{8}(\frac{1}{4}*AVE)+\frac{1}{4}*AVE$ where AVE is the value computed at step 906. If step 912 determines the door is not opening thereby indicating the door is being powered closed, a step 916 determines if the PWM flag is set indicating the motor is being variably controlled by the duty cycle modulated pulsewidth signal. If the PWM flag is not set, the stall time is computed at step 914 in the same manner as when the door was being power opened.

If step 916 determines the PWM flag is set, a step 918 determines the stall time offset as a function of the duty cycle established by the Update PWM routine of FIG. 15. The stall time is then determined at step 920 by summing the offset obtained via step 918 to the last determined position pulse period PTIM. The stall time offset obtained at step 918 is inversely proportional to the duty cycle of the pulsewidth modulated signal so that the stall time is larger for low duty cycle/low motor torque conditions versus high duty cycle/high motor torque conditions. This provides the desired result of providing door reversal at low obstruction load values at high motor torque conditions while at the same time preventing reversal of the power movement at excessively low obstruction load resistances at low motor torque conditions.

A step 922 then determines whether or not the plungers have engaged represented by the active state of the PLUNGER signal. If the plungers have been engaged, they present a higher resistance to door movement thereby necessitating an increase in the duty cycle of the signal applied to the motor for maintaining door speed. To prevent the Control Power move routine of FIG. 13 from interpreting this condition as a reversal condition, a step 924 increases the stall time. In one embodiment, the stall time is doubled so that the resulting slow down of the door when it engages the plungers is not interpreted by the control power move routine as an obstruction load. Once the stall time is determined, a step 926 limits the stall time to predetermined minimum and maximum values after which the program exits the routine.

The foregoing description of a preferred embodiment is not to be considered as limiting or restricting the invention since many modifications may be made by the exercise of skill in the art without departing from the scope of the invention.

The embodiments of the invention in which an exclusive property or privilege is claimed are defined as follows:

1. A door control method for a door controller for a vehicle door, the door controller including an electric drive means and a power source for supplying a pulse width modulated control voltage at a controlled duty cycle to the electric drive means for energizing the electric drive means to drive the vehicle door to a closed position, the electric drive means having a torque output varying in direct relationship to the controlled duty cycle, the method comprising the steps of:

sensing door movement;

sensing door speed;

determining a distance of sensed door movement while the sensed door speed is continuously less than a desired speed since a last increase in the controlled duty cycle;

determining a distance of sensed door movement while the sensed door speed is continuously greater than the desired speed since a last decrease in the controlled duty cycle;

increasing the controlled duty cycle to increase the torque output of the electric drive means to increase door speed when the determined distance of sensed door movement while the sensed door speed is continuously less than the desired speed since a last increase in the controlled duty cycle exceeds a first predetermined distance; and decreasing the controlled duty cycle to decrease the torque output of the electric drive means to decrease door speed when the determined distance of sensed door movement while the sensed door speed is continuously greater than the desired speed since a last decrease in the controlled duty cycle exceeds a second predetermined distance, whereby the door speed is controlled to the desired speed.

2. The method of claim 1 wherein the first predetermined distance is greater than the second predetermined distance, whereby the conditions for increasing door speed are more restrictive than the conditions for decreasing door speed.

* * * * *